Jan. 10, 1967 C. E. GERMANTON 3,297,829

PRIORITY AND NONPRIORITY SERVICE REGULATING EQUIPMENT

Filed Oct. 23, 1963 9 Sheets-Sheet 1

INVENTOR
C. E. GERMANTON
BY Donald M Duft
ATTORNEY

Jan. 10, 1967 C. E. GERMANTON 3,297,829

PRIORITY AND NONPRIORITY SERVICE REGULATING EQUIPMENT

Filed Oct. 23, 1963 9 Sheets-Sheet 2

Jan. 10, 1967 C. E. GERMANTON 3,297,829

PRIORITY AND NONPRIORITY SERVICE REGULATING EQUIPMENT

Filed Oct. 23, 1963 9 Sheets-Sheet 5

3,297,829
PRIORITY AND NONPRIORITY SERVICE REGULATING EQUIPMENT

Charles E. Germanton, Summit, N.J., assignor to Bell Telephone Laboratories, Incorporated, New York, N.Y., a corporation of New York Filed Oct. 23, 1963, Ser. No. 318,427
21 Claims. (Cl. 179—27)

This invention relates to switching systems and particularly to switching equipment utilized for regulating the equitable distribution of different classes-of-telephone calls to operator positions on a non-priority and priority basis. The present invention further relates to equipment which regulates the ordered sequence in which an idle operator position is made available for serving each of the different classes-of-calls during heavy traffic periods.

In recent years, new switching systems and procedures have been developed for enabling telephone operators to serve several different classes-of-special service calls more efficiently and with less effort. Included among these special service calls are those classified as: person-to-person, dial "O," credit card, charge-to-a-third party, and collect calls. The present invention is concerned with regulating the equitable distribution of such special service calls to operator positions. Accordingly, this invention finds one specific use, by way of example, in a newly developed telephone system of the type disclosed in the R. B. Curtis patent application Serial No. 318,275, filed concurrently herewith, in which the aforementioned types of special service calls may be received in incoming trunk circuits at a tandem telephone office and then be connected to operator positions for service.

In the system set forth in the Curtis disclosure, incoming trunk circuits are segregated into trunk groups in accordance with the nature of the equipment at the originating offices to which the trunk circuits are connected. Each of these groups of trunk circuits is capable of serving some or all of the dial "O," person-to-person, collect, charge-to-a-third party, and credit card classes-of-special service calls served by the tandem system. The trunk circuits of each of these trunk groups are individually associated with one of a number of position link connectors which, under the control of a fewer number of position link controllers, serve to interconnect the calling trunk circuits with the operator positions on both non-priority and priority bases.

Each of the trunk circuits is arranged for initially requesting connections through the associated position link connector to one of the operator positions on a non-priority basis at the time it receives an incoming call. After a calling trunk circuit has been connected to a position and the needed assistance has been furnished by an operator, the trunk circuit may be disconnected from the position. Thereafter, if operator assistance again is needed while the call is in progress, the trunk circuit may request connections to the same or another operator position on a priority basis.

The non-priority and priority connection requests received from the trunk circuits are registered in the associated position link connectors. After such requests have been registered and if an operator position is available for serving the classes-of-calls for which the requests are made, the position link connectors compete with one another for engaging an idle one of the position link controllers to control the interconnection of the requesting trunk circuits with the available operator positions.

In accordance with the switching system of the Curtis disclosure, each of the position link controllers assigns an ordered preference to each of the position link connectors and this preference controls the order in which competing position link connectors may engage the controller to control the interconnection of calling trunk circuits with operator positions. Each of the position link controllers rotates the order of preference after it has served a position link connector for assuring that calling trunk cricuits on one position link connector are not always preferred for connection to operator positions over the calling trunk circuits on the other position link connectors.

While the foregoing preference arrangement promotes the equitable connection of calling trunk circuits to operator positions, it alone is unable to insure that all priority requesting trunk circuits on all of the position link connectors are connected to operator positions before any of the trunk circuits concurrently requesting non-priority connections to the same positions. This inability results from the fact that a position link connector having only a registered non-priority request is at certain times more preferred for engaging a position link controller than another position link connector having a registered priority request. As a consequence, with such an arrangement alone, non-priority requesting trunk circuits would at times be connected to operator positions before priority requesting trunk circuits.

In view of the foregoing, it is apparent that additional equipment is required for regulating the ordered sequence in which priority and non-priority requesting trunk circuits on the different position link connectors are interconnected with operator positions and, more specifically, for regulating the sequence in such a manner that a plurality of position link connectors are enabled to connect priority requesting trunk circuits to operator positions before any non-priority requesting trunk circuits.

A further consideration for the foregoing system is that it is important, from a traffic service standpoint, for operator positions to be able to serve, on an equitable basis, each of the classes-of-calls which they may have been adapted, or preconditioned, to serve. The Curtis telephone system is adequately equipped for enabling operator positions to receive the appropriate classes-of-calls one at a time and to serve all such calls on an equitable basis during light traffic periods. However, in order to serve such calls on an equitable basis during heavy traffic periods, it is imperative that some additional means of regulation be employed in the system for regulating the ordered sequence in which the operator positions are made available for serving the different classes-of-calls which may be awaiting priority and non-priority connections to the positions. Otherwise, certain problems arise in the system which make it extremely difficult for operators to serve the different classes-of-calls in the approximate order in which they are received in the system. For instance, when all operator positions are busy and operators become idle one by one after serving a call, an idle operator's position would immediately become available for receiving any one of the different classes-of-calls which it is preconditioned to serve. As a consequence, the preference arrangements incorporated into the position link connector and controller circuits would not recognize which classes-of-calls were received earliest and usually would be unable to connect calls to the operator position in the order in which they were received in the system during the heavy traffic period. Thus, without additional equipment, certain classes-of-calls may be forced to wait while later received classes-of-calls are served repeatedly.

In view of the foregoing, it is an object of my invention to provide switching equipment for regulating the equitable distribution of a number of different classes-of-telephone calls to operator positions on non-priority and priority bases.

Another object is to provide switching equipment for regulating the ordered sequence in which priority and non-priority requesting trunk circuits on different position link connectors are interconnected with operator positions to insure that priority requesting trunk circuits are connected to the positions before non-priority requesting trunk circuits.

It is a further object to provide switching equipment for regulating the ordered sequence in which operator positions are made available to serve different classes-of-calls during heavy traffic conditions in order that the calls may be served on an equitable basis in the approximate order in which they are received in the system.

Yet another object is to provide switching equipment for regulating the ordered sequence in which operator positions are made available during heavy traffic periods to serve different classes-of-calls awaiting priority and non-priority connections to the positions which are selectively preconditioned for serving some or all of the different classes-of-calls.

These and other objects are attained in accordance with an exemplary embodiment of my invention wherein switching equipment is provided for use in a telephone system, as set forth in the Curtis disclosure, for regulating the call traffic to operator positions and, particularly, for regulating the traffic in such a manner as to enable calls in all priority requesting trunk circuits to be connected through position link connectors to the available positions before non-priority requesting trunk circuits.

In accordance with the present invention, a traffic regulator circuit ascertains the availability of the operator positions to serve each of the different classes-of-calls and supplies appropriate "position available" and "positions busy" signals to a plurality of position link connectors for controlling the interconnections of calling trunk circuits with operator positions on both non-priority and priority bases. Specifically, the traffic regulator is activated when a trunk circuit has registered a priority request in one of the position link connectors for supplying "position available" signals to that connector in accordance with the actual availability of the operator positions to serve the different classes-of-calls. At the same time, the regulator supplies "positions busy" signals to all of the other position link connectors of the system which do not have registered priority requests and these busy signals signify that all positions are busy to those connectors. As a consequence, only the position link connector receiving the "position available" signals is enabled to engage a position link controller for controlling the interconnection of the priority requesting trunk circuit with an available position. In contrast, the position link connectors receiving the "positions busy" signals are blocked from engaging a position link controller until after the priority requesting trunk circuit has been connected to an operator position.

The traffic regulator further includes apparatus for regulating the order in which calls requesting non-priority and priority connections are served during heavy traffic periods when operator positions become idle one by one after serving a call. Instead of making the idle position immediately available for serving all classes-of-calls which it is conditioned to serve, this apparatus immediately makes it available for serving certain of those classes-of-calls and then, after a timed delay interval, makes it available for serving all of the other classes-of-calls which it is conditioned to serve. Among the classes-of-calls, for which the idle position is immediately made available, are: a call for which a trunk circuit is requesting priority service and a call for which a trunk circuit has been requesting non-priority service longer than certain other classes-of-calls for which non-priority service is also being requested.

This regulating apparatus comprises an individual class relay for each of the class-of-calls served by the system and it is controlled by the operator position equipments to indicate when at least one of the positions is available for serving that class-of-call. In addition, an individual "positions busy" relay is provided for each of the classes-of-calls served by the system and it is operative under the control of the corresponding class relay for supplying "positions busy" and "position available" signals to all of the associated position link connectors.

During heavy traffic periods when all operator positions are busy, all of the "positions busy" relays are operated to supply "positions busy" signals to all of the position link connectors for temporarily blocking them from engaging the position link controllers. At the same time, certain of the "positions busy" relays are made slow-releasing by shunting their secondary windings by a low impedance. These slow-releasing relays correspond to the classes-of-calls which presently do not require priority service or which have not been awaiting non-priority service longer than certain other classes-of-calls. In contradistinction, the "positions busy" relays corresponding to the classes-of-calls which have been waiting longer than certain other classes-of-calls are concurrently fast releasing devices.

The traffic regulator comprises a priority circuit which identifies when any one of the position link connectors has registered a priority request and this circuit thereupon is activated for opening the shunting paths around the secondary windings of all of the "positions busy" relays to make them fast releasing. This mode of operation insures that when an operator position becomes idle, "position available" signals are quickly supplied to the position link connector having the priority request for rapidly effecting the connection of the priority requesting trunk circuit to the idle operator position.

The traffic regulator also employs a call-waiting control circuit for ascertaining the approximate order in which the different classes-of-calls are received in the system and for appropriately controlling the fast and slow release characteristics of the "positions busy" relays to insure that longer waiting classes-of-calls may be served before the relatively shorter waiting classes-of-calls.

At the time that an operator position becomes idle during the heavy traffic period, the faster releasing "positions busy" relays are enabled to release under the control of the corresponding class relays for supplying "position available" signals to all position link connectors for the corresponding classes-of-calls before the slower releasing "positions busy" relays are able to release for supplying "position available" signals for their corresponding class-of-calls. Accordingly, the position link connectors are enabled to compete with one another for engaging an idle position link controller for connecting a priority requesting trunk circuit to available position before any non-priority requesting trunk circuit, and for connecting a longer waiting non-priority requesting trunk circuit to the position before a shorter waiting non-priority requesting trunk circuit when no trunk circuit is requesting priority connections during the heavy traffic period.

It is a feature of my invention that switching equipment regulates the connection of call traffic requesting both non-priority and priority connections to operator positions by supplying "position available" and "positions busy" signals to a number of connector circuits for enabling those circuits to interconnect all calls requesting priority service with available operator positions before any call requesting non-priority connections.

Another feature is that switching equipment is provided for regulating the equitable connection of a number of different classes-of-calls to operator positions or non-priority and priority bases by supplying "position available" signals to the connector circuits having a priority connection request from a calling circuit and "positions busy" signals to other connector circuits having a non-priority connection request from a calling circuit.

A further feature is the provision of switching equipment for regulating the ordered sequence in which an operator position is made available for serving a plurality of different classes-of-calls during heavy traffic periods and, particularly, for regulating the sequence so that the longer waiting classes-of-calls are served before shorter waiting classes-of-calls during heavy traffic periods.

Yet another feature is that traffic regulating equipment includes an individual class relay for each one of the classes-of-calls served by a telephone system for indicating when at least one operator position is available to serve that class-of-call, and an individual "positions busy" relay which is controlled by one of the class relays for supplying "position available" and "positions busy" signals to connector circuits for enabling the longer waiting classes-of-calls to be connected to operator positions before the shorter waiting classes-of-calls during heavy traffic periods.

Still another feature is that the "positions busy" relays be selectively controllable by a call-waiting circuit in the traffic regulating equipment to have either a fast or a slow release characteristic during heavy traffic periods, that each of the fast release "positions busy" relays correspond to a class-of-call which has been waiting for connections to an operator position longer than certain other classes-of-calls, that the slow release "positions busy" relays correspond to the shorter waiting classes-of-calls, and that, when an operator position becomes idle, the fast release relays immediately release for supplying "position available" signals to the connector circuits for effecting the connection of the longer waiting classes-of-calls to the idle operator position in preference to the shorter waiting classes-of-calls.

It is another feature of my invention that the "positions busy" relays be controllable by a priority circuit in the traffic regulating equipment to have the fast release characteristic whenever a call is requesting priority connections to an operator position and thereby to insure that, when an operator position becomes idle after an all positions busy condition, "position available" signals for all classes-of-calls served by that position are quickly supplied to the connector circuits for rapidly connecting the priority requesting call to the idle position.

A complete understanding of the foregoing and other advantages and features of my invention may be gained from a consideration of the following description, together with the accompanying drawing, in which:

FIGS. 1 and 2 are block diagrams depicting the equipment of the illustrative embodiment and comprise a group of ten position link connectors and a CAMA position link employed in a tandem telephone system for connecting 500 incoming trunk circuits and 40 senders to 66 operator positions through position control circuits and position circuits under the control of position link controllers and a traffic regulator;

FIGS. 3–9, inclusive, show in block and schematic form the essential circuit details of ten position link connectors, three position link controllers, a CAMA position link, a key control position control circuit, position control circuits, and the traffic regulator; and FIG. 10 depicts the position in which FIGS. 1–9 should be placed to show the cooperation between the equipment units.

It is noted that FIGS. 3–9 employ a type of schematic notation referred to as "detached-contact" in which an "X" crossing a line represents a normally opened contact of a relay and a bar crossing a line represents a normally closed contact of relay or key; "normally" referring to the unoperated condition of a relay or key. The principles of this type of notation are described in an article entitled "An Improved Detached-Contact-Type Schematic Circuit Drawing," by F. T. Meyer in the September 1955 publication of the American Institute of Electrical Engineers (AIEE) Transactions, Communications and Electronics, vol. 74, pp. 505–513.

Each relay contact is designated in the drawing in a manner which indicates the relay of which it is a part and as well uniquely identifies it with respect to other contacts of the relay. For example, referring to relay contact CW0–1 of FIG. 3, it is noted that the "CW0" part of the designation indicates that it is controlled by relay CW0 of FIG. 3 and the "–1" uniquely identifies it with respect to another contact CW0–2 of relay CW0, the latter contact being also shown on FIG. 3.

The equipment of the present invention may be advantageously incorporated in an automatic tandem telephone system wherein common control circuits are employed to control the establishment of calls through a switching network. One such system is disclosed in aforementioned R. B. Curtis application (hereinafter referred to as the Curtis disclosure). It is to be understood, however, that the present invention is not limited to use with a telephone system of this type, but that it may also be utilized with other types of switching system, such as local and toll systems.

The equipment illustrative of the principles of the present invention has been embodies in a tandem system of the type disclosed in the Curtis disclosure. It is particularly concerned with the apparatus in the position link connectors PL0–PL9, position link controllers LC0–LC2, CAMA position link and controller CPL and CLC, position control circuits PCC1–PCC66, and the key control position control circuit KCP shown in heavy lines on FIGS. 1 and 2. The other equipment units are neither shown nor described in detail herein except where necessary for a complete understanding of the present invention. The cited Curtis disclosure together with J. Baumfalk-T. P. McGuinness-R. C. Nance patent application Ser. No. 318,407, N. L. Laefer patent application Ser. No. 318,355, and A. H. Scheinman patent application Ser. No. 318,360, filed concurrently herewith may be consulted for a complete understanding of the construction and operation of the units not covered in detail herein. The CAMA position link and controller CPL and CLC of FIGS. 1 and 7 form a part of the tandem system in the Curtis disclosure, but it is disclosed in more extensive detail in the R. N. Breed et al. Patent 2,848,543, granted Aug. 19. 1958.

GENERAL DESCRIPTION

The general organization of the principal equipment units of the illustrative embodiment of my invention will now be described with reference to FIGS. 1 and 2. The crossbar tandem system as set forth in the aforementioned Curtis disclosure is designed to serve several different classes-of-calls, such as person-to-person calls and other special service calls, such as dial "O," coin, charge-to-a-third party, credit card and collect calls, as well as CAMA (Centralized Automatic Message Accounting) calls. These types of calls are extended to the tandem system from an originating office via incoming trunks, such as the special service trunks TK00–TK94 and the CAMA trunk CT. Each of these trunks is illustrative of the numerous trunks provided for a fully equipped tandem system for serving each of the different classes-of-calls. The trunks TK00–TK94 and CT are terminated individually in the incoming trunk circuits TC00–TC94 and CTC, respectively.

Each of the trunk circuits TC00–TC94 and CTC has two principal appearances in the switching network of the tandem system. One appearance is on the trunk link frame TLF and is used for establishing the talking connections for the calling and called stations through the office link frame OLF and outgoing trunk circuit OTC in a manner as set forth in the cited Curtis disclosure and Breed et al. patent.

A second appearance is on the sender link SL and is used for passing information to and from the common control circuits, such as the senders S00–S39 and marker M, of the system. Trunk circuits TC00–TC94 each have another appearance on the operator position link connector circuit and it is used for selectively connecting the trunk circuit to operator positions on non-priority and priority bases.

In the illustrative embodiment of my invention, the dial "O" and other special service trunk circuits, such as circuits TC00–TC94, are segregated into trunk groups according to the class-of-calls which they serve. There are a maximum of ten trunk groups on each of the position link connectors PL0–PL9, namely, trunk groups 0–9. Each such group comprises only trunk circuits that serve the same class-of-call. There are five trunk circuits in each trunk group on the position links PL0–PL9. Thus, a maximum of ten different class-of-service trunk groups can be served by each of the position link connectors PL0–PL9. However, in this illustrative embodiment, only six different class-of-service trunk groups are shown. This arrangement facilitates the control over the circuit operations involved in interconnecting the trunk circuits with operator positions and permits the circuits in each class-of-service group to be served on an equitable basis under the control of the traffic regulator TR.

Each designation of the trunk circuits TC00–TC94 includes a number comprising a digit indicating the trunk group into which it has been placed and a digit which uniquely identifies it within that group. To illustrate, the designation of trunk circuit TC00 includes the number 00 which compises the first digit 0 to indicate the trunk group 0 and the last digit 0 uniquely to identify the trunk circuit relative to the other four trunk circuits in the same group.

For requesting connections to the operator positions on non-priority and priority bases, each of the dial "O" and special service trunk circuits, such as circuits TC00–TC94, is equipped with non-priority and priority start leads NPS0–NPS94 and PS0–PS94, respectively. The trunk circuits may selectively request connections to the operator positions either on a non-priority or a priority basis by applying a service request signal to the appropriate non-priority or priority start lead.

Each of trunk circuits on the position link connectors PL0–PL9 is arranged for initially requesting connections to one of the operator positions OP1–OP66 on a non-priority basis at the time that it receives an incoming call. After this call has been served by an operator, the operator position may be disconnected from the calling trunk circuit. Thereafter, the calling trunk may selectively request connections to the same or another operator position on a priority basis when assistance again is required on the call.

It may be seen in FIGS. 1 and 2 that a position link connector and a position link controller circuit, such as circuits PL0 and LC0, together provide the facilities for interconnecting the dial "O" and special service trunk circuits, such as circuits TC00–TC94, with the operator positions OP1–OP66 via position control circuits and position circuits PCC1–PCC66 and PC1–PC66. The position link connectors PL0–PL9 comprise the actual interconnecting means and each of the position link controllers LC0–LC2, as its name implies, controls the operations of the position link connectors PL0–PL9 in such a fashion that all of the calling trunk circuits are interconnected with operator positions on an equitable basis.

Each of the position links PL0–PL9 includes individual non-priority and priority register-start circuits, such as circuits NPRS0–NPRS9 and PRS0–PRS9 of FIGS. 1 and 2, for each of the class-of-service trunk groups. These register-start circuits register non-priority and priority service requests received from the associated fifty trunk circuits and apply appropriate non-priority and priority start signals to both the traffic regulator TR and the associated position link controllers LC0–LC2. Non-priority requests are received by the position link connectors PL0–PL9 from the dial "O" and special service trunk circuits over the leads NPS– – and are applied to the non-priority register-start circuits, such as circuits NPRS0–NPRS9, through individual class-of-service gate circuits, such as circuits CG0–CG9. Each of these gate circuits is controlled by the traffic regulator TR in order to insure that the dial "O" and special service calls received by the incoming trunk circuits are served in the approximate order in which they are presented for service.

Priority service requests from dial "O" and special service trunk circuits are received by the position link connectors PL0–PL9 over the priority start leads PS– – and are registered in the priority register-start circuits, such as circuits PRS0–PRS9, independently of the gating system employed for the registration of non-priority requests. As a consequence, the priority register-start circuits are effective to activate the traffic regulator TR and one of the position link controllers LC0–LC2 for allowing the priority requesting trunk circuits to be interconnected with operator positions before any of the non-priority requesting trunk circuits.

As is indicated in FIGS. 1 and 2, each of the position link connectors PL0–PL9 in the presently disclosed embodiment has a maximum of fifty trunk circuits connected to its input and 198 position loops connected to its output. Illustrative of the latter arrangement is the connection of the trunk circuits TC00–TC94 (fifty trunk circuits) to the input of the switching network SN of the position link connector PL0 and the position loops L0–L197 to the output of network SN. Each of the position link connectors PL0–PL9 employs a switching network SN for connecting trunk circuit information and control leads, such as the leads of the cables ICC0 and ICC94 of FIG. 2, to the position loops L0–L197.

Turning now to the CAMA equipment features, it may be noted that incoming CAMA trunk circuits, such as circuit CTC of FIG. 1, are connectable through the sender link SL to the senders S00–S39 in a manner as disclosed in the cited Breed et al. patent. Senders S00–S39 are divided into four groups of ten each, namely, sender groups 0–3. These groups of senders are connected over the information and control leads of the cables CIC0–CIC39 to the switching network CSN of the CAMA position link CPL by which the senders S00–S39 are enabled to connect with any one of the 66 operator positions over the CAMA position loops CL1–CL66 under the control of a CAMA position link controller, such as controller CLC.

Senders S00–S39 are provided with means for requesting only routine, or non-priority, connections through the switching network CSN to the operator positions OP1–OP66. The routine connection requests are received by the position link CPL from the senders S00–S39 over the sender start leads SS00–SS39 and are applied to the register-start circuits RS0–RS3 through the individual gate circuits GC0–GC3. The latter circuits are controlled by the traffic regulator TR to insure that the CAMA calls served by the senders S00–S39 are connected to the positions OP1–OP66 in the approximate order in which they are presented for service.

In the following description, the position link connectors PL0–PL9 and the CAMA position link CPL may be referred to simply as a position link or as a link. Accordingly, this terminology is used extensively throughout the remainder of the specification.

The position link connectors, such as links PL0–PL9, are arranged together into link groups, each of which comprises ten position link connectors. An arrangement of the position link connectors forming one such link group and the association of those position link connectors with incoming trunk circuits, position link controllers, operator positions, a traffic regulator and other control circuits is illustrated in FIGS. 1 and 2. Three position link controllers are provided for each link group to control the ten position link connectors.

Sixty-six operator positions are connected to the ten position links PL0–PL9 and the CAMA position link CPL via individual position circuits and position control circuits as well as the aforementioned position loops L0–L197 and CL1–CL66. Each of the position control circuits, such as circuit PCC1, of the position units PU1–PU66 is individually associated with three loops, such as loops L0–L2, extending to the position links PL0–PL9, and one of the CAMA loops, such as loop CL1, extending to the position link CPL. Thus, the position links PL0–PL9 and CPL serve to interconnect any one of 500 incoming trunk circuits and 40 senders with any one of 66 position control circuits via 264 position loops.

Each of the 66 operator positions is provided with a position unit, such as unit PU1 of FIG. 1, which comprises a position control circuit and a position circuit. These circuits, together with the equipment at the operator position, provide four loop circuits whereby an operator may serve calls. Each of the position control circuits, for example, circuit PCC1 of FIG. 2, includes facilities for automatically conditioning each of the associated loops for connecting calls one by one through the position circuit to the operator position. The control circuit also comprises apparatus for enabling an operator to connect her telephone to any calling loop associated with her position and to place a hold condition on any calling loop while she serves a call on another loop.

A key control position control circuit KCP of FIG. 2 is associated with the position control circuits PCC1–PCC66 for selectively preconditioning the operator positions OP1–OP66 for serving one or more of the six different classes-of-calls receivable from the trunk circuits TC00–TC94. The individual position control circuits PCC1–PCC66 inform the control circuit KCP whether the associated operator is available to serve each of the different classes-of-calls and circuit KCP, in turn, passes that information to the traffic regulator TR for enabling it to regulate the ordered sequence in which each of the different classes-of-calls is distributed to the operator positions OP1–OP66.

An operator can actively serve only one call at a time in this exemplary embodiment even though four loops, such as loops L0–L2 and CL1, are provided for each position. In addition, when an operator is actively serving a call on one loop, the position link appearances of the remaining three loops will appear busy and no calls will be offered to these loops at that time. Four loop circuits are provided for each position because, on some of the calls, the calling loop may be utilized for the entire duration of the call. Accordingly, if only one loop circuit was provided and it was utilized for serving such a call, the operator would be idle and would have no functions to perform for the duration of the call after she had completed the services required of her in connection with the establishment of that call. By providing four loops, a call can be offered to any idle loop while another loop in the same group is being utilized on another call for which the operator has completed the active servicing thereof. To facilitate the serving of such a call on an idle, or unused, loop, the position control circuit changes the busy condition on the position link appearances of the unused loop to an idle condition after the operator completes the active servicing of a call on another loop. Thus, the serving of the 264 position loops by the 66 operator positions enables a plurality of incoming calls to be extended to and served by a plurality of operators with minimum delay.

The traffic regulator TR of FIG. 2 regulates the distribution of calls to the operator positions OP1–OP66 from all trunk circuits served by the position links PL0–PL9 and from the 40 senders associated with the position link CPL. The regulator TR controls the distribution by ascertaining the service demands by the various trunk circuits and senders, as well as, the availability of operator positions to serve these demands. It accomplishes the regulation by controlling the gate circuits CG0–CG9 and CG0–CG3 of FIG. 1 and by controlling the position availability signals which it supplies to the position busy circuits PBC0–PBC9 and GBAC–GBGC of the position links PL0–PL9 and CPL.

The regulator TR controls the gate circuits CG0–CG9 and GC0–GC3 to admit service requests concurrently received from groups of calling trunk circuits and senders into the associated register-start circuits NPRS0–NPRS9 and RS0–RS3 in order that the trunk circuits and senders may be connected on a non-priority basis to available ones of the operator positions OP1–OP66 on an equitable basis. After these requests have been admitted and registered, the regulator TR closes the gates in the position links to lock out from those links all other senders and trunk circuits which are in the same class-of-service trunk and sender groups as the circuits having already registered requests, and which may subsequently request connections on a non-priority basis to the operator positions OP1–OP66. This insures that incoming calls requesting the same class-of-service are served in the approximate order in which they are received at the tandem office. After the closure of the latter class-of-service gates, the regulator allows non-priority service requests from trunk circuits in other class-of-service groups to be admitted and registered in the position links and these latter trunk circuits may compete for connections to the operator positions with the other trunk circuits and senders which have previously registered non-priority service requests.

Regulator TR also cooperates with all of the associated position links PL0–PL9 and CPL, as well as the link controllers LC0–LC2 to provide for the connection of trunk circuits to the operator positions OP1–OP66 on a priority basis. When a trunk circuit requests priority service, the regulator is activated to supply "positions busy" signals to the positions busy circuits PBC0–PBC9 and GBAC–GBGC for making all of the operator positions OP1–OP66 appear busy to all of the position links CPL and PL0–PL9 which are not associated with a trunk circuit requesting priority service, and while at the same time, allowing the available positions to appear idle to each of the position links associated with a priority requesting trunk circuit. As a result, each priority requesting trunk is connected through the switching network, such as network SN, of the position link to an available position before any trunk circuit or sender requesting non-priority service.

Regulator TR also provides for the efficient use of the three position link controllers LC0–LC2 by the ten position links PL0–PL9. The efficiency is achieved because the regulator TR, after it has checked the availability of the operator positions to serve the trunk circuits requesting service, sends "position available" signals to all ten of the position links PL0–PL9 and, accordingly, allows each of these links to seize one of the controllers LC0–LC2 only if an operator is available to serve a call on a trunk circuit having a request registered in that link.

Further in accordance with the present invention, the traffic regulator TR regulates the ordered sequence in which the operator positions OP1–OP66 are made available to serve the six different classes-of-calls served by the position links PL0–PL9 and the CAMA calls served by the CAMA position link CPL, during heavy traffic periods when the operator positions become idle one by one. It accomplishes this regulation by initially admitting into its call-waiting and master gate control circuit groups of trunk circuits and senders which are concurrently requesting connections to the positions OP1–OP66. This control circuit then effects the closing of the appropriate ones of the control gates CG0–CG9 and GC0–GC3 on the position links PL0–PL9 and CPL for blocking the registration of subsequently received non-priority requests.

When all of the positions are busy, unoccupied, or otherwise unavailable during a heavy traffic period, the traffic regulator TR supplies "positions busy" signals for activating all of the positions busy circuits PBC0–PBC9 on each of the position links PL0–PL9 and all of the positions group busy circuits GBAC–GBGC on the CAMA position link CPL to inform these links of the non-availability of the positions OP1–OP66. A positions busy circuit is provided on each of the position links PL0–PL9 for each of the six different classes-of-calls served by those links. A positions group busy circuit is provided on the CAMA position link CPL for each of the seven different groups into which the operator positions OP1–OP66 are segregated.

As the positions OP1–OP66 become idle one by one during the heavy traffic period, the regulator TR signals the position links PL0–PL9 before the CAMA position link CPL that a position is available. In certain instances, the now idle position will have been preconditioned for serving a number of the classes-of-calls presently on the trunk circuits and senders admitted into the call-waiting and master gate control circuit, as well as the other classes-of-calls on trunk circuits which have not been so admitted and which are presently requesting non-priority connections to the positions OP1–OP66. However, the regulator TR will insure that the idle operator position is made available for connection to one of the admitted trunk circuits or one of the other trunk circuits which is requesting priority connections. In doing so, the regulator TR will prefer connection to the idle operator position those trunk circuits which have been admitted into the master gate control circuit and will handicap the trunk circuits as well as senders which have not been so admitted unless the trunk circuits are requesting priority connections to the operator positions. The regulator accomplishes this preference and handicapping of both trunk circuits in the different classes-of-service and senders by supplying "position available" signals to links PL0–PL9 for deactivating the positions busy circuits PBC0–PBC9 which correspond to the admitted and priority requesting groups of trunk circuits before supplying such signals for deactivating the positions busy and group busy circuits corresponding to the other groups of trunk circuits and senders which have not been admitted and which the idle operator is capable of serving. By supplying the "position available" signals in this order, each of the position links PL0–PL9 is enabled to seize one of the link controllers LC0–LC2 for effecting the interconnection of the admitted and priority requesting trunk circuits to the positions OP1–OP66 before the non-admitted trunk circuits and senders.

After all of the admitted and priority requesting groups of trunk circuits on the links PL0–PL9 have been connected to operator positions and positions are yet becoming idle one by one, the regulator TR prefers the admitted groups of senders for connection to the idle operator position and handicaps the groups of trunk circuits on links PL0–PL9 which have not been admitted and are not requesting priority connections to the positions. This regulation is accomplished by supplying "position available" signals to the CAMA link CPL for deactivating the group busy circuits GBAC–GBGC before supplying such signals for deactivating the positions busy circuits PBC0–PBC9 on the links PL0–PL9.

DETAILED DESCRIPTION

Referring now to FIGS. 3–9, a detailed description will be presented of the circuit operations involved in providing for the regulation of the connection of incoming special service and CAMA calls to the operator positions OP1–OP66. This description is directed only to those circuit details necessary for a clear understanding of the present invention. Other circuit details necessary to integrate the present invention into an operating tandem system are set forth in the cited Curtis disclosure. Accordingly, FIGS. 3–9 show only the structural details of one traffic regulator TR and the control leads over which that regulator is interconnected with apparatus of the position links PL0–PL9, position link controllers LC0–LC2, CAMA position link CPL, position control circuits PCC1–PCC66 and the key control position control circuit KCP.

Figure 3:
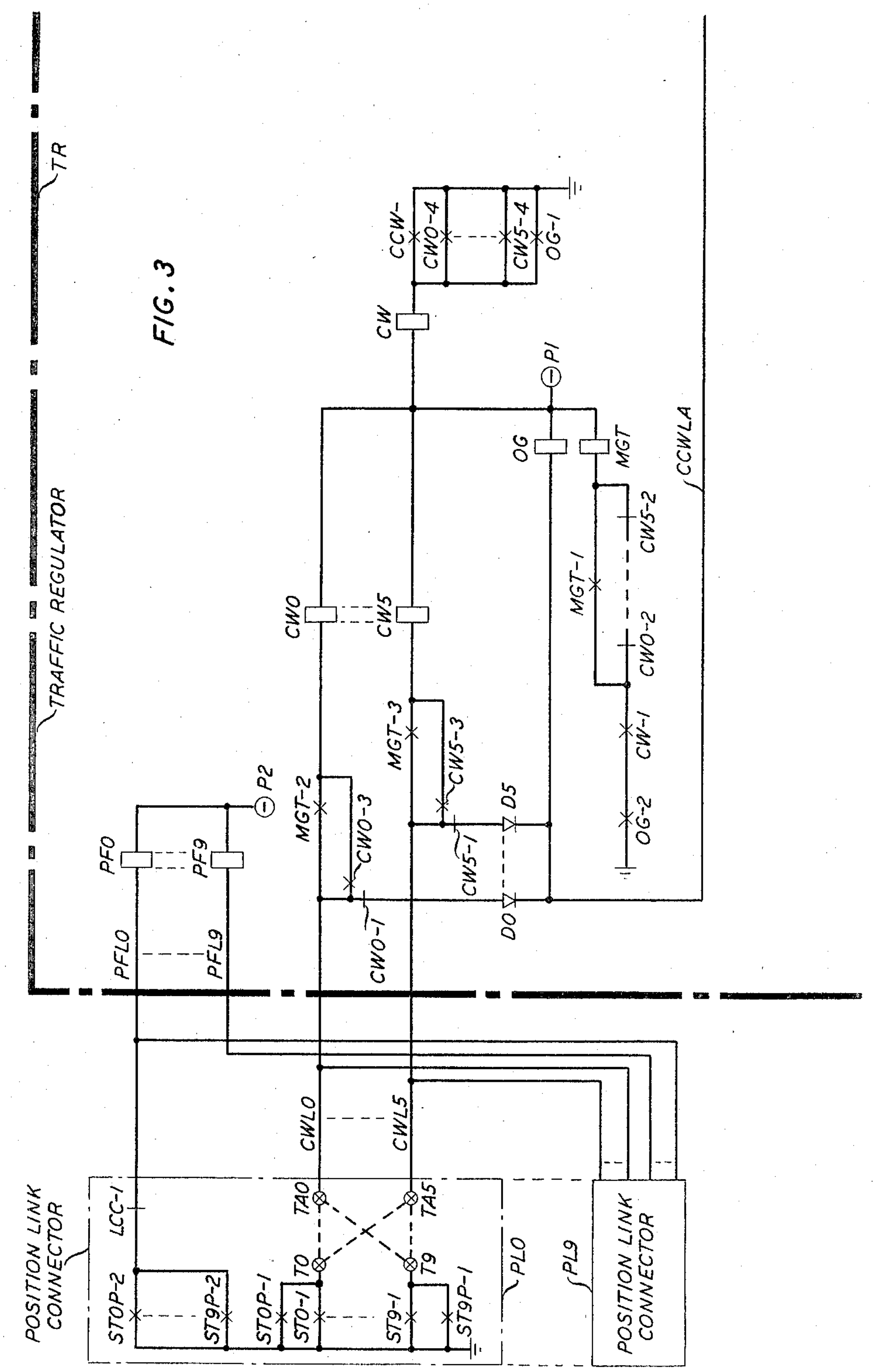

*Call-waiting and gate control.*—In FIG. 3, it may be noted that there are five call-waiting relays CW0–CW5 in the traffic regulator TR. Each of these relays is individually identified with one of the six different class-of-service trunk groups on each of the position links PL0–PL9 and is utilized for indicating when a call is waiting to be served in that trunk group. It may be emphasized that there are only six different classes-of-service in this illustrative embodiment and that each of the position links PL0–PL9 serves ten trunk groups. Therefore, certain of the trunk groups on the same position link must be assigned to the same class-of-service and be identified with the same one of the relays CW0–CW5.

Referring to the left side of FIG. 3, the terminals T0–T9 are associated with the ten different trunk groups on the position link PL0. One of the two make contacts ST– – and ST–P– intermediate each of the T– terminals and ground is closed if a trunk circuit in the associated group is currently requesting either non-priority or priority connections to one of the operator positions OP1–OP66 (FIGS. 1 and 2) for a class-of-service call represented by the T– terminal. These contacts are controlled by the non-priority and priority start relays ST– and ST–P, respectively, (not shown in the present drawing but shown in FIGS. 107A–107C of the Curtis disclosure) which are included in the non-priority and priority register-start circuits NPRS0–NPRS9 and PRS0–PRS9 depicted in FIGS. 1 and 2. Thus, for example, ground will be applied through contact ST0–1 to the terminal T0 only in the event that a trunk circuit in trunk group 0 is requesting non-priority connections to an operator position. Similarly, ground will be applied through contact ST0P–1 only if a trunk circuit in trunk group 0 is requesting priority connections to an operator position.

Figure 1:
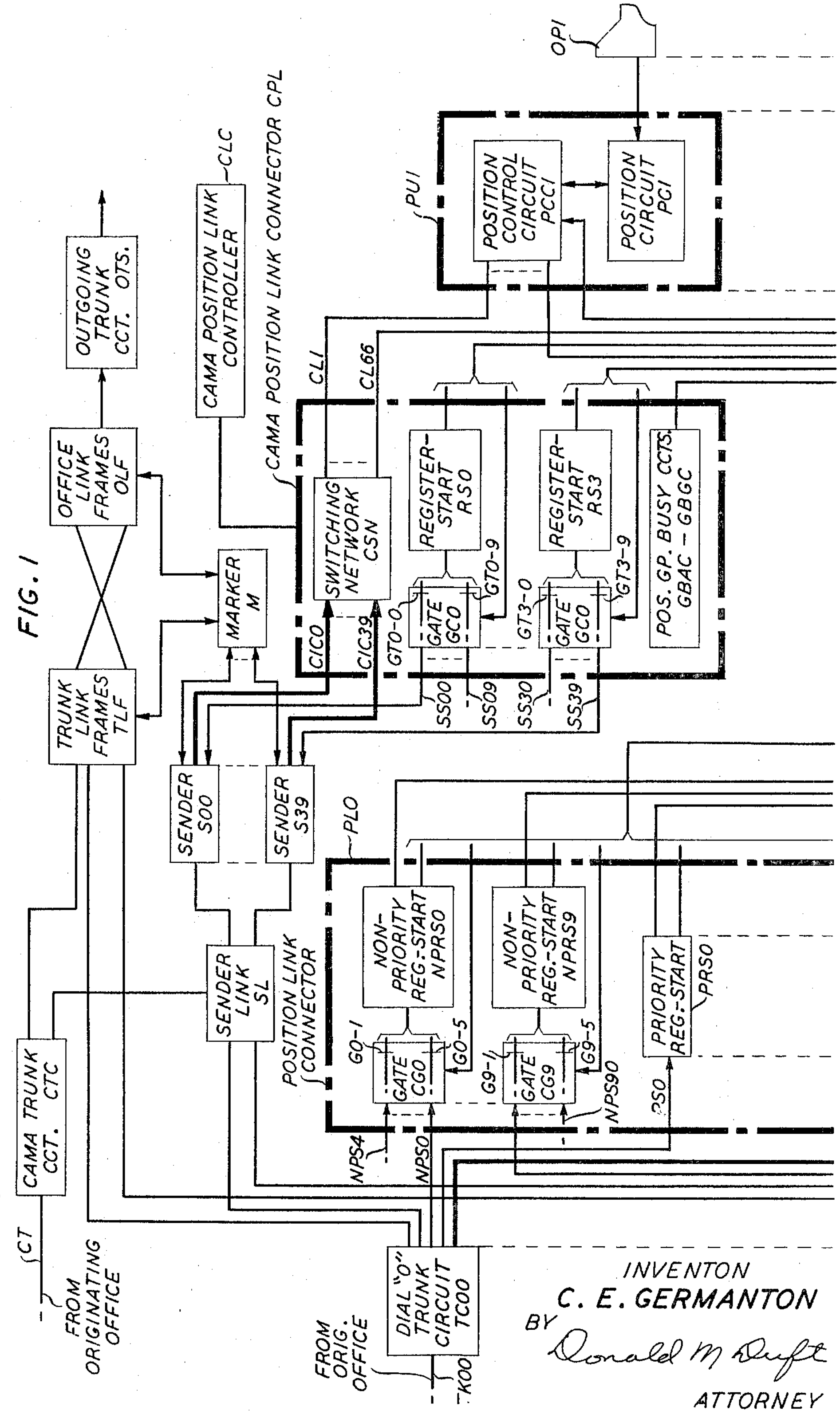

The cross-connection between the terminals T0–T9 and the terminals TA0–TA5 of FIG. 3 classifies each of the ten groups of trunk circuits of position link PL0 to one of the six different classes-of-service. In the exemplary embodiment, the trunk circuit TC00 of FIG. 1 is of the dial "O" class-of-service and is in trunk group 0 of position link PL0. Consequently, terminal T0 is connected to terminal TA0 thereby indicating that all calls served by trunk group 0 of position link PL0 will be of the dial "O" type. There are ten terminals T0–T9 and only six terminals TA0–TA5 and therefore certain of these TA– terminals must be connected to more than one of the T– terminals. Accordingly, a plurality of the trunk groups on position link PL0 must be assigned to serve the same class-of-service calls.

For the purpose of illustration, it may be assumed that the dial "O" trunk circuit TC00 of FIG. 1 has presented a service request over either the non-priority or priority start lead NPS0 or PS0 during a lull in traffic when no other trunk circuit served by the same link group is currently requesting connections to an operator position which is presently available to serve a dial "O" call. The non-priority request is applied through the control gate CG0 of FIG. 1 and is registered in the associated non-priority register-start circuit NPRS0. On other hand, the priority request is applied directly to the priority register-start circuit PRS0 of FIG. 1. After the registration of the non-priority or priority request, either the relay ST0 or ST0P (not shown in the present drawing but shown in FIGS. 107A–107C of the Curtis disclosure) is operated as set forth in the Curtis disclosure and causes the operation of relay OG of FIG. 3. The latter relay operates over the path from the negative potential P1 through its winding, diode D0, contact CW0–1, lead CWL0, terminals TA0 and T0 and contact ST0–1 or ST0P–1 to ground.

Before describing the circuit operations that follow the operation of relay OG, it is advisable at this point to explain certain of the priority service features of the traffic regulator TR. Referring to FIG. 3, it may be seen that there are ten priority frame relays PF0–PF9 in the regulator TR. Each of these relays is connected over one of the leads PFL0–PFL9 to one of the position links PL0–PL9, and is operated whenever a priority request has been registered in that position link. For example, whenever a priority request has been registered in one of the priority register-start circuits PRS0–PRS9 of link PL0, the corresponding one of the ST0P–ST9P relays (not shown) of that link is operated to complete a circuit for operating the relay PF0 of FIG. 3. This circuit is from the negative potential P2 through the PF0 relay winding, lead PFL0, contact LCC–1, and one of the contacts ST0P–2 through ST9P–2 to ground. When one of the relays PF0–PF9 operates, it in turn operates certain of the non-priority relays NP0–NP9 of FIG. 9, as hereinafter described, for causing all positions busy signals to be supplied to all of the position links PL0–PL9 except that link having the registered priority request. The manner in which the NP0–NP9 relays are operated and the busy signals are supplied to the various position links is deferred for explanation in the following section entitled "Position Availability Signals to Position Links PL0–PL9."

Figure 7:
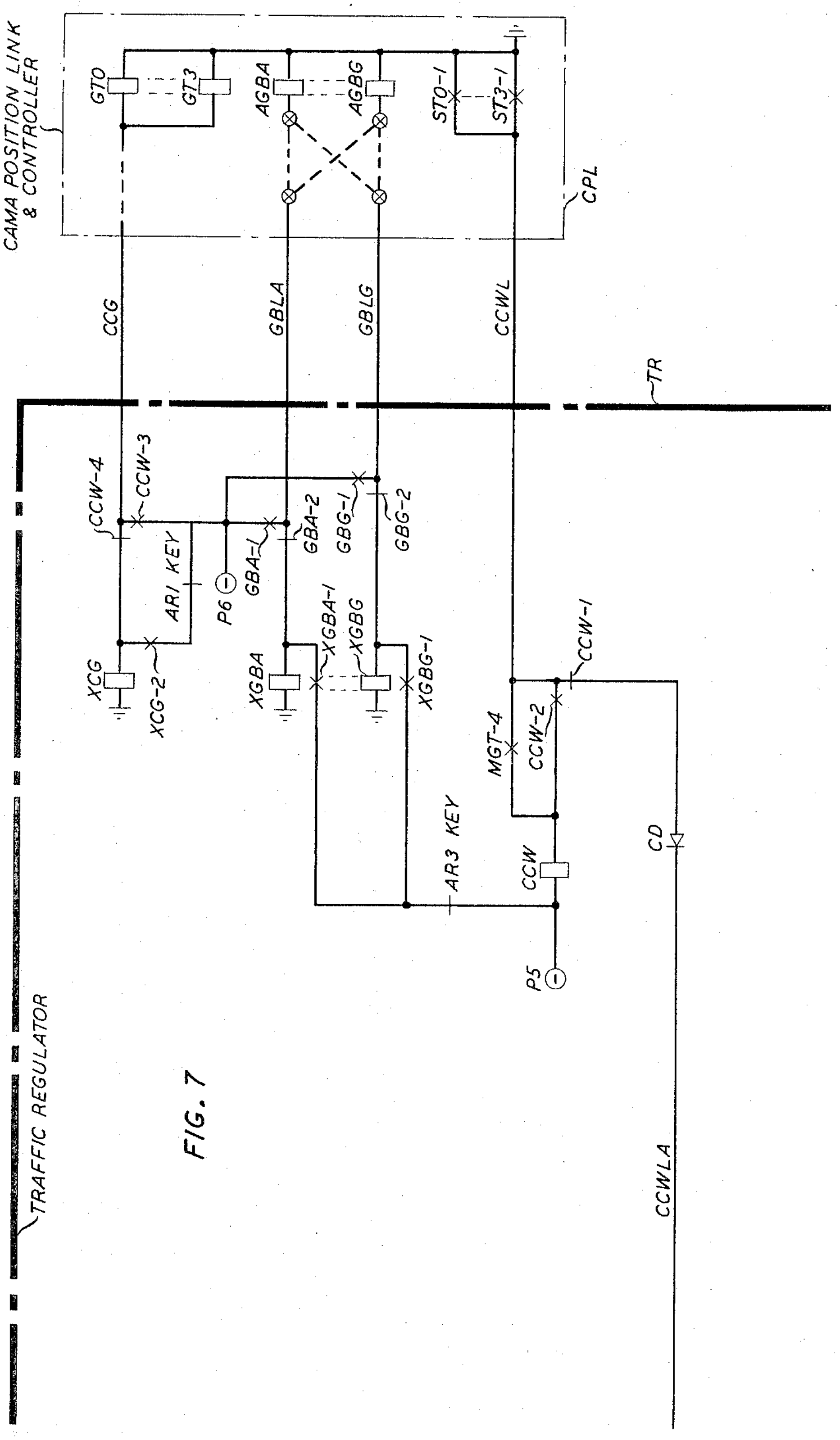
Figure 8:
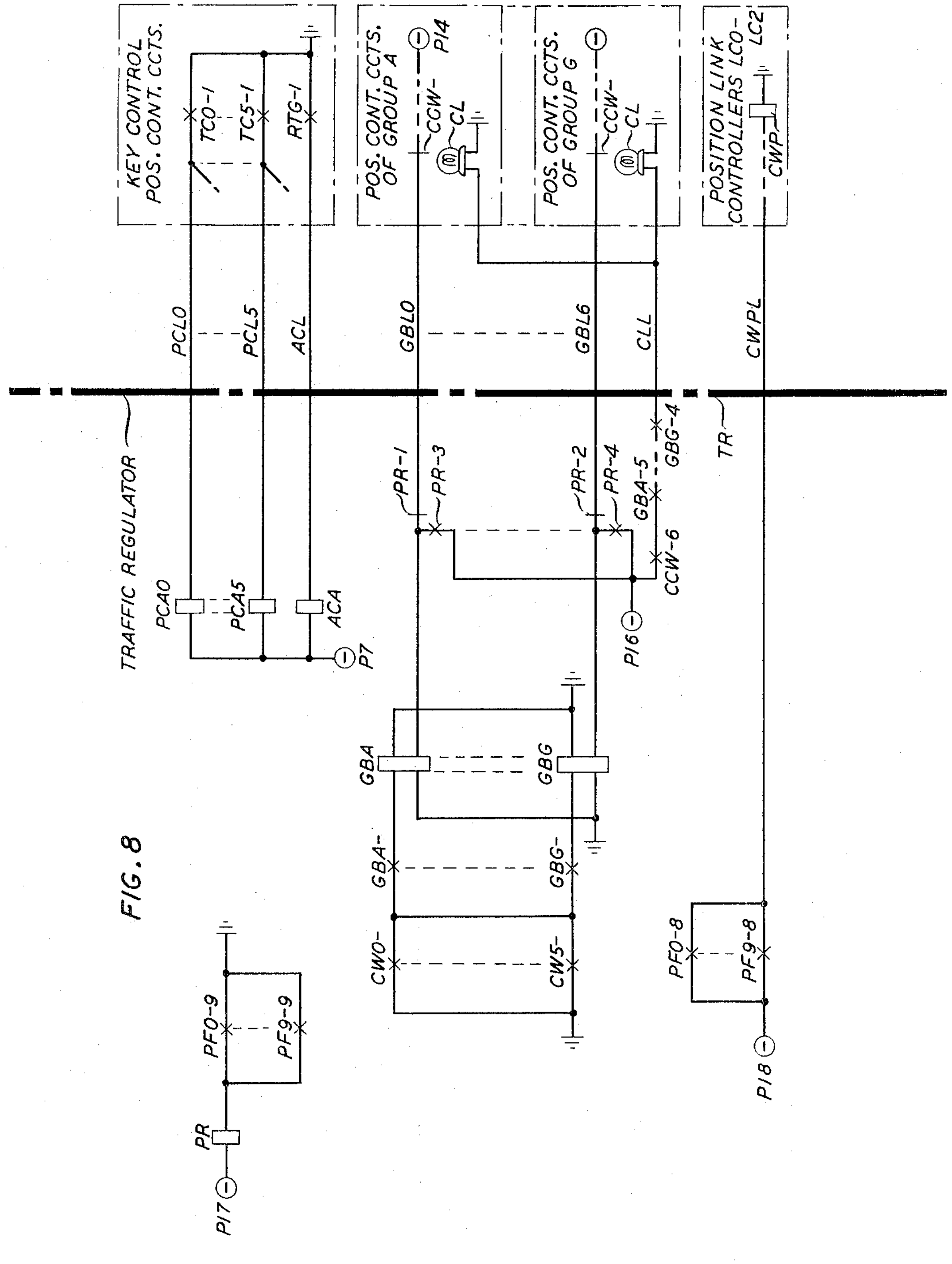
Figure 10:
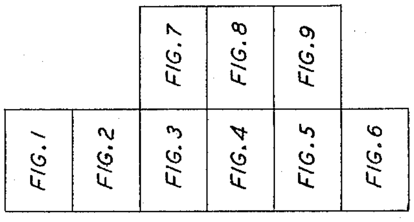

When one of the PF0–PF9 relays is operated, it causes the operation of the priority relay PR of FIG. 8 over the path from the negative potential P17 through the PR relay winding and a make contact, such as contact PF0–9, of the operated one of the PF0–PF9 relays to ground. In operating, relay PR activates all of the positions group relays GBA–GBG of FIG. 8 over the parallel paths from ground through the GBA–GBG relay windings and the make contacts, such as contacts PR–3 and PR–4, of relay PR to the negative potential P16. The operations of the GBA–GBG relays, in turn, cause the operations of the group busy relays AGBA–AGBG in the CAMA position link CPL of FIG. 7. By operating relays AGBA–AGBG, the traffic regulator TR informs link CPL that the operator positions OP1–OP66 of FIG. 1 are not presently available for serving CAMA calls. Accordingly, link CPL is unable to connect a CAMA trunk circuit to an idle one of the positions OP1–OP66 while, on the other hand, the idle positions are made available for connection to the priority requesting trunk circuits on the links PL0–PL9 as later explained. Relays AGBA–AGBG operate over the parallel paths in FIG. 7 from ground through their windings, leads GBLA–GBLG and make contacts of the relays GBA–GBG to the negative potential P6.

In addition, when one of the relays PF0–PF9 is operated, it causes the negative potential P18 of FIG. 8 to be connected through one of its make contacts, such as contact PF0–8, to lead CWPL for operating the "call-waiting priority service" relay CWP in each of the link controllers LC0–LC2 of FIG. 1 when these controllers are engaged in connecting non-priority requesting trunk circuits on links PL0–PL9 with the position OP1–OP66 at the time the priority request is registered in one of the links PL0–PL9. The operation of relay CWP in any of the controllers LC0–LC2 informs that controller to finish connecting the non-priority requesting trunk circuit with one of the positions OP1–OP66 and then to initiate a series of circuit actions, as set forth in the cited Laefer disclosure, whereby each priority requesting trunk circuit is thereafter connected to one of the positions OP1–OP66 before any non-priority requesting trunk circuit.

Continuing now with the description of the circuit operations that follow the operation of relay OG, it is noted that after relay OG operates, it causes the operation of the call-waiting relay CW of FIG. 3 over the path from the potential P1 through its winding and contact OG–1 to ground. The operation of relay CW operates the master gate relay MGT of FIG. 3 over the path from potential P1 through its winding, contacts CW5–2, CW4– through CW1– (not shown), CW0–2, CW–1 and OG–2 to ground. Upon operating, relay MGT locks through contacts MGT–1, CW–1 and OG–2 to ground.

The operation of relay MGT admits the dial "O" call into the control of the master gate relay circuit and also operates the call-waiting relay CW0 which is associated with the dial "O" class-of-service. Relay CW0 operates in the path from potential P1 through its winding and contact MGT–2 to the ground supplied on lead CWL0 via terminals TA0 and T0 and contact ST0–1 or ST0P–1 of link PL0. When operated, relay CW0 locks through its contact CW0–3 to the ground on lead CWL0. At the same time, relay CW0 provides a supplementary operate path for relay CW through contact CW0–4 to ground. Relay CW0 also opens contact CW0–1 to release relay OG. Upon releasing, relay OG opens contact OG–2 to release relay MGT. Thus, the traffic regulator TR has recognized that a dial "O" class-of-service trunk circuit is requesting connections to one of the operator positions OP1–OP66 of FIGS. 1 and 2.

After relay MGT releases, it may not be reoperated until after contact CW0–2 is reclosed upon the release of relay CW0. The latter relay is released following the connection of the trunk circuit TC00 to one of the operator positions OP1–OP66 of FIGS. 1 and 2 as later explained. Thus, trunk circuits in class-of-service trunk groups other than the dial "O" groups may register non-priority connection requests in the position links PL0–PL9 as described in the Curtis disclosure and cause the grounding of the leads CWL1–CWL5 of FIG. 3 after relay MGT has been released.

The grounding of any one of the leads CWL1–CWL5 will cause the reoperation of relay OG of FIG. 3, for example, over the path from lead CWL5 through contact CW5–1, diode D5 and the OG relay winding to potential P1. However, in operating, relay OG cannot reoperate relay MGT because contact CW0–2 is opened. Accordingly, none of the relays CW1–CW5 may be operated until after relay MGT is reoperated because make contacts of relay MGT, such as contact MGT–3, are serially connected in the operate circuit of these relays and are presently opened to prevent a ground on the CWL1–CWL5 leads from completing the operate circuit for the relays CW1–CW5. Hence, non-priority requests of other trunk circuits of trunk groups other than the dial "O" groups will not be blocked from being registered in their associated non-priority register-start circuits of the position links PL0–PL9 during the period while circuit TC00 is being connected to one of the operator positions OP1–OP66. These other non-priority requesting trunk circuits may then be connected to the operator positions OP1–OP66 at the same time as circuit TC00 in a manner as explained in the Curtis disclosure if there are enough of the operator positions available to serve the calls thereon.

Following the operation of relay CW0, all control gate circuits, such as circuit CG0 of FIG. 1, of the position links PL0–PL9 which are associated with the dial "O" class-of-service trunk groups are closed, as hereinafter explained, to block the registration of subsequent non-priority requests in the non-priority register-start circuits of links PL0–PL9. This insures that dial "O" trunk circuits are connected to operator positions OP1–OP66 in the approximate order in which they receive dial "O" calls.

Figure 4:
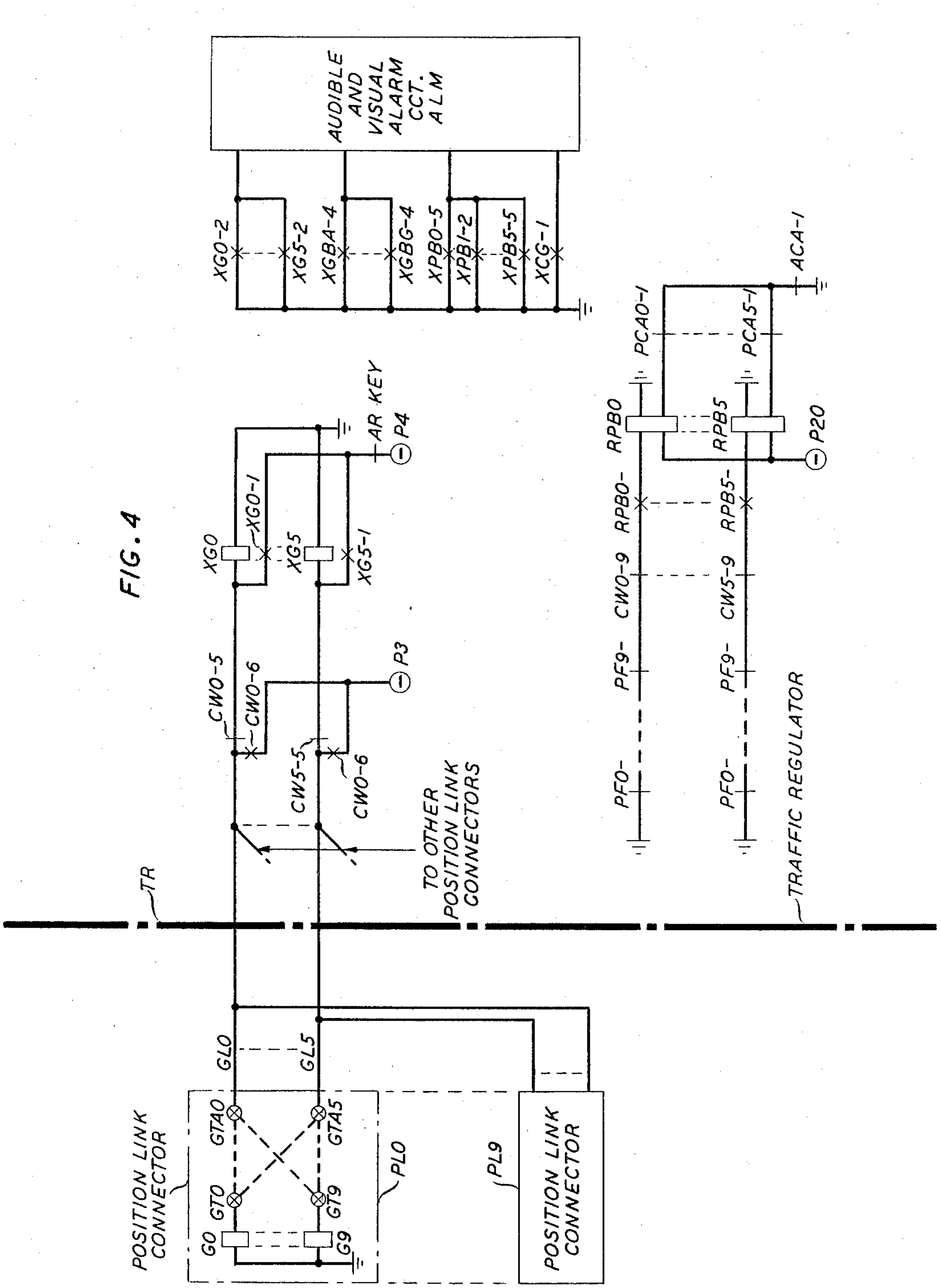

Before describing the circuit actions that follow as a result of the operation of relay CW0, it is advisable to present a few remarks with regard to the circuitry of FIG. 4. It may be seen in FIG. 4 that there are ten G– relays, G0–G9, in the position link PL0. One of these relays is included in each of the control gate circuits CG0–CG9 of FIG. 1. These relays are operative under the control of the call-waiting relays CW0–CW5 to block the registration of requests in the non-priority register-start circuits, such as circuits NPRS0–NPRS9, of the position links PL0–PL9. Referring specifically to the position link PL0 by way of example, it may be noted that the winding of each of the relays G0–G9 is connected to one of the terminals GT0–GT9 which is individually identified with one of the trunk groups on link PL0. The numeric of each of the designations for these terminals corresponds to the trunk group with which the terminal is identified; for example, treminal GT0 is identified with trunk group 0.

The cross-connection between the terminals GT0–GT9 of the position links PL0–PI9 and the terminals GTA0–GTA5 of FIG. 4 is made in accordance with the class-of-service assigned to each of the trunk groups on the links PL0–PL9. For instance, trunk group 0 of link PL0 has been assigned to a dial "O" class-of-service in this embodiment and, accordingly, terminals GT0 and GTA0 are cross-connected. There are ten terminals GT0–GT9 on each of the links PL0–PL9 and only six terminals GTA0–GTA9; therefore, certain of these GTA– terminals must be connected to more than one of the GT– terminals on each of the links PL0–PL9 since certain of the trunk groups on these links are assigned to serve the same class-of-service calls.

Each of the terminals GTA0–GTA5 is also connected to an individual one of the cross-detector relays XG0–XG5 over the leads GL0–GL5 and contacts CW0–5 through CW5–5. Each of these relays is a sensitive relay which operates if an electrical potential of sufficient magnitude is present on the associated GL– lead. To illustrate, let it be assumed that a negative potential of sufficient magnitude is present on lead GL5 as the result of a cross between leads GL0 and GL5 when the negative potential P3 is applied to lead GL0 as later described. The presence of this potential on lead GL5 immediately operates relay XG5 over the path through contact CW5–5 and the XG5 relay winding to ground. Upon operating, relay XG5 locks through its contact XG5–1 and the break contact of the alarm release key AR to the negative potential P4. The operation of relay XG5 also closes its contact XG5–2 to activate the visual and audible alarm circuit ALM. Thereafter, an attendant may identify and correct the indicated cross and activate the key AR to open the locking path of relay XG5 for releasing it.

By providing the XG0–XG5 cross-detector relay arrangement, the traffic regulator TR is enabled to insure that the control gate relays G0–G9 of FIG. 4 are not falsely operated. In the event that the relays G0–G9 were operated by foreign potentials applied to leads GL– as the result of falsely crossed leads, the regulation of call traffic would be seriously impaired. For example, if the relay G0 were falsely operated by a permanent negative potential on lead GL0 and the XG0 relay were not provided, non-priority requests of dial "O" trunk circuits on link PL0 would be improperly blocked from being registered in the register-start circuit NPRS0. In addition, non-priority requests of dial "O" trunk circuits on the other links PL1–PL9 perhaps would be denied registration in the corresponding register-start circuits of those links since the negative potential on lead GL0 would also operate the corresponding control gate relays G– of those links.

The control gate relays G0–G9 of FIG. 4 each comprise five break contacts each of which is individually connected in series with one of the register-start circuits NPRS– and a non-priority start lead NPS– of a trunk circuit in the same class-of-service trunk group. In gate CG0 of FIG. 1, for example, the break contacts G0–1 through G0–5 are serially connected between the NPS0–NPS4 leads and the register-start circuits NPRS0. When a G– relay is operated by a CW– relay, as later explained, it opens its five break contacts to close the gate and thereby block non-priority request signals from being applied to the associated register-start circuit NPRS–.

Returning now to the previous description concerned with the circuit actions that follow the operation of relay CW0, it may be seen in FIG. 4 that operated relay CW0 applies the potential P3 through contact CW0–6 to the lead GL0 for operating all control gate relays, such as relay G0, associated with dial "O" class-of-service trunk groups. The operation of these relays blocks the registration of non-priority requests in the dial "O" register-start circuits, such as circuit NPRS0 of FIG. 1, of links PL0–PL9 until after trunk circuit TC00 of FIG. 1 has been connected to one of the operator positions OP1–OP66. Relay G0 of link PL0 operates over the path from ground through the G0 relay winding and terminals GT0 and GTA0 to the potential on lead GL0. In operating, relay G0 opens its contacts G0–1 through G0–5 of FIG. 1 to block the application of non-priority requests of the trunk circuits TC01–TC04 (not shown) from the register-start circuit NPRS0 until after trunk circuit TC00 has been connected to one of the positions OP1–OP66.

In the instant case, it has been assumed that an operator position is available to serve a dial "O" class-of-call. Accordingly, the traffic regulator TR will have signaled the link PL0 in a manner as described later, that a position is available. Link PL0 then associates itself with one of the link controllers LC0–LC2 of FIGS. 1 and 2 and that controller proceeds to control the interconnection of trunk circuit TC00 and an available one of the positions OP1–OP66 via the switching network SN of FIG. 2, one of the position loops L0–L197 and position units PU1–PU66 in a manner as set forth in the Curtis disclosure.

After trunk circuit TC00 has been connected to a position, and if there is no other dial "O" trunk circuit on links PL0–PL9 which registered a non-priority request concurrently with circuit TC00, the relay ST0 or ST0P (not shown) opens contact ST0–1 or ST0P–1 of FIG. 3 to effect the release of relay CW0. In releasing, relay CW0 opens its contact CW0–6 to release relay G0 on link PL0 and all other corresponding G– relays associated with the dial "O" trunk groups on the links PL0–PL9. This will permit new non-priority requests from dial "O" trunk circuits on these position links to be registered in the appropriate register-start circuit NPRS–.

Thereafter, all of the CW0–2 through CW5–2 contacts in the operate path of relay MGT in FIG. 3 are normal to indicate that all calls with the master gate have been served. Thus, relay MGT may be reoperated by relay OG of FIG. 3 when the latter relay is operated as the result of the grounding of any one of the leads CWL0–CWL5 as previously explained.

*CAMA call-waiting and gate control.*—Referring to FIG. 7, a CAMA call-waiting relay CCW is provided in the traffic regulator TR for controlling the gate relays GT0–GT3 in the CAMA position link CPL and thereby the regulation of the order in which the senders S00–S39 of FIG. 1 are connected to the operator positions OP1–OP66. When a request has been registered in one of the register start circuits RS0–RS3 in the CAMA position link CPL of FIG. 1, it results in the grounding of the lead CCWL of FIG. 8 under the control of the contacts ST0–1 through ST3–1 of the group start relays ST0–ST3 (not shown) of link CPL.

The ground on lead CCWL is extended through contact CCW–1, diode CD, lead CCWLA into FIG. 3 and the OG relay winding to potential P1 for operating relay OG. In operating, relay OG operates relay CW over the previously stated path. When all of the CW0–CW5 relays are released and relays OG and CW are operated, relay MGT is operated over the path from potential P1 through its winding and the contacts CW5–2 through CW0–2, CW–1 and OG–2 to ground.

Upon operating, relay MGT causes the operation of relay CCW over the path from the negative potential P5 through its winding and contact MGT–4 to the ground on lead CCWL. When operated, relay CCW locks via contact CCW–2 to the ground on lead CCWL. At the same time, relay CCW opens contact CCW–1 to effect the release of relay OG. Relay OG then opens contact OG–2 to release relay MGT. Operated relay CCW also closes contact CCW–3 to lock relay CW operated.

The operation of relay CCW operates all of the gate relays GT0–GT3 on the CAMA position link CPL over the path from ground through the GT0–GT3 relay windings in parallel, lead CCG and contact CCW–3 to the negative potential P6. In operating, the relay GT0–GT3 open their respective break contacts, such as contacts GT0–0 through GT0–9 of FIG. 1, which are serially connected with the leads SS0–SS39 and the register-start circuits RS0–RS3 to block the registration of new sender requests for connections to the positions OP1–OP66 until each of the senders having a registered request in the circuits RS0–RS3 has been connected to an operator position. After the last such sender has been connected to a position in a manner as described in the cited Breed et al. patent, the ground on lead CCWL is removed and relay CCW releases for enabling new sender requests for connections to an operator position to be registered in the circuits RS0–RS3.

In FIG. 7, a sensitive cross-detector relay XCG is connected through contact CCW–4 to lead CCG for detecting foreign potentials on lead CCG and preventing such a potential from operating the gate relays GT0–GT3 and thereby causing the blocking of the registration of sender requests from the register-start circuits RS0–RS3 of FIG. 1. Such a potential usually is connected to lead CCG as the result of a lead being falsely crossed with lead CCG and, if it is of a sufficient magnitude, it causes the operation of relay XCG. In operating, relay XCG closes contact XCG–1 to notify the alarm circuit ALM of FIG. 4 of the cross. Operated relay XCG also closes a locking path for itself through contact XCG–2 and a break contact of the alarm release key AR1 to the negative potential P6. Relay XCG thereafter is released after an attendant eliminates the cross condition and momentarily operates the alarm release key AR1 to open the locking path for relay XCG.

Figure 2:
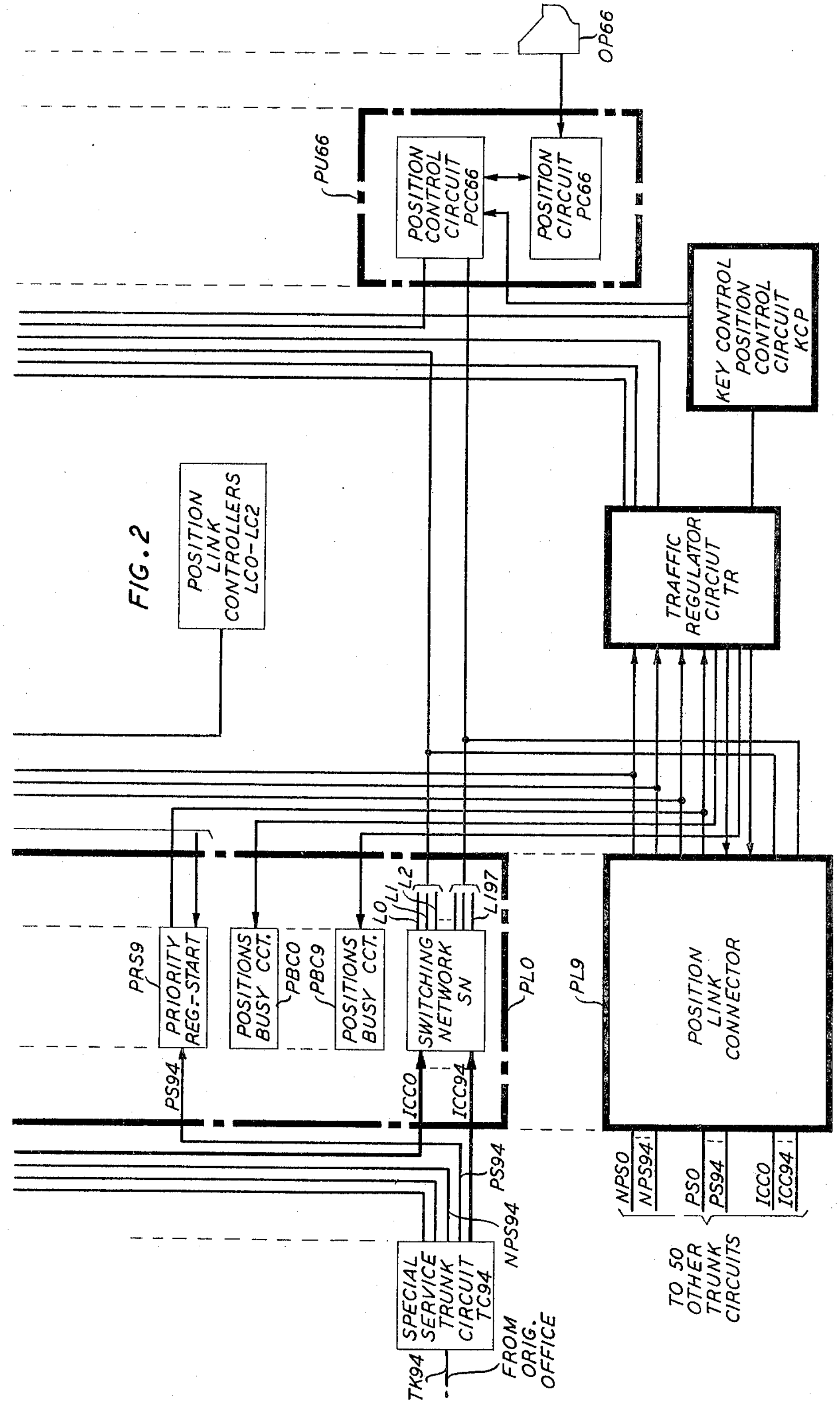

*Position availability signals to position links PL0–PL9.*—The traffic regulator TR maintains a constant check on all of the 66 operator positions OP1–OP66 of FIGS. 1 and 2 to ascertain if they are currently available to serve the six different class-of-service calls receivable by the trunk circuits associated with the position links PL0–PL9. This checking operation enables the regulator TR to send "position available" signals to all ten links PL0–PL9 and thereby allows each of those links to seize one of the three link controllers LC0–LC2 of FIG. 1 only if an operator is available to serve a received call.

In FIG. 8, it may be seen that the regulator TR includes six relays PCA0–PCA5 for checking the availability of the 66 operator positions for serving the six different class-of-service calls. Each of these relays is identified with an individual one of the six class-of-service trunk groups provided on each of the links PL0–PL9. A PCA– relay is operated under the control of a trunk class relay TC– – (not shown in the present drawing but shown in FIG. 158 of the Curtis disclosure) in the key control position control circuit KCP of FIG. 8 when at least one of the positions OP1–OP66 of FIGS. 1 and 2 is available to serve calls of the particular class-of-service with which that PCA– relay is identified.

Circuit KCP continually receives information concerning the availability of the positions OP1–OP66 from the position control circuits of the position units PU1–PU66 of FIGS. 1 and 2 as set forth in the Curtis disclosure. Thereafter, circuit KCP enables its trunk class relays TC– – (not shown) to apply ground to the appropriate ones of the leads PCL0–PCL5 of FIG. 8. The presence of ground on a PCL– lead signifies that an operator is available and the absence thereof signifies that an operator is not available. Ground on a PCL– lead causes the operation of the associated PCA– relay over the obvious path. For example, the PCA0 relay in FIG. 8 is operated over the path from the ground on lead PCL0 through the PCA0 relay winding to potential P7 in this illustrative embodiment only if at least one of the positions OP1–OP66 is available to serve dial "O" calls.

The relays PCA0–PCA5 are used to control the operation of the six positions busy relays RPB0–RPB5 in the traffic regulator TR, of which only the relays RPB0 and RPB5 are shown in FIG. 4. Each of these RPB0–RPB5 relays is operable under the control of one of the PCA0–PCA5 relays for supplying the "positions busy" and "position available" signals to each of the position links PL0–PL9 over the leads PBL0–PBL5 of FIGS. 5 and 6. An RPB– relay is unoperated, or released, under control of a PCA– relay when at least one of the positions OP1–OP66 is available to serve a class-of-call identified with that PCA– relay. In contradistinction, an RPB– relay is operated under the control of a PCA– relay when none of the positions OP1–OP66 is available to serve calls of the particular class-of-service with which that PCA– relay is identified. For example, relay RPB0 is operated when relay PCA0 is unoperated and it operates over the path from the negative potential P20 through the lower winding of relay RPB0 and contacts ACA–1 and PCA0–1 to ground. Upon operating, an RPB– relay may shunt its upper winding to ground through one of its own make contacts and break contacts of the associated call-waiting relay CW– and the ten priority frame relays PF0–PF9 for making that relay RPB– a slow-releasing device. This slow-releasing characteristic is used, as hereinafter explained, for regulating the ordered sequence in which the positions OP1–OP66 are made available for serving the different classes-of-calls during heavy traffic periods.

It may be noted that the operate path for each of the relays RPB0–RPB5 includes the break contact ACA–1 of the "all classes available" relay ACA of FIG. 7. This relay is operated under control of the key control position control circuit KCP when at least one of the positions OP1–OP66 is available to serve all classes-of-calls. Relay ACA is operated over the path from the negative potential P7 through its winding, lead ACL to ground via contact RTG–1 in circuit KCP. The latter contact is controlled by relay RTG (which is not shown in the present drawing but is shown in FIG. 158 of the Curtis disclosure). Upon operating, relay ACA opens the operate paths for all of the relays RPB0–RPB5 to signify that at least one operator is available to serve all classes-of-calls.

Figure 5:
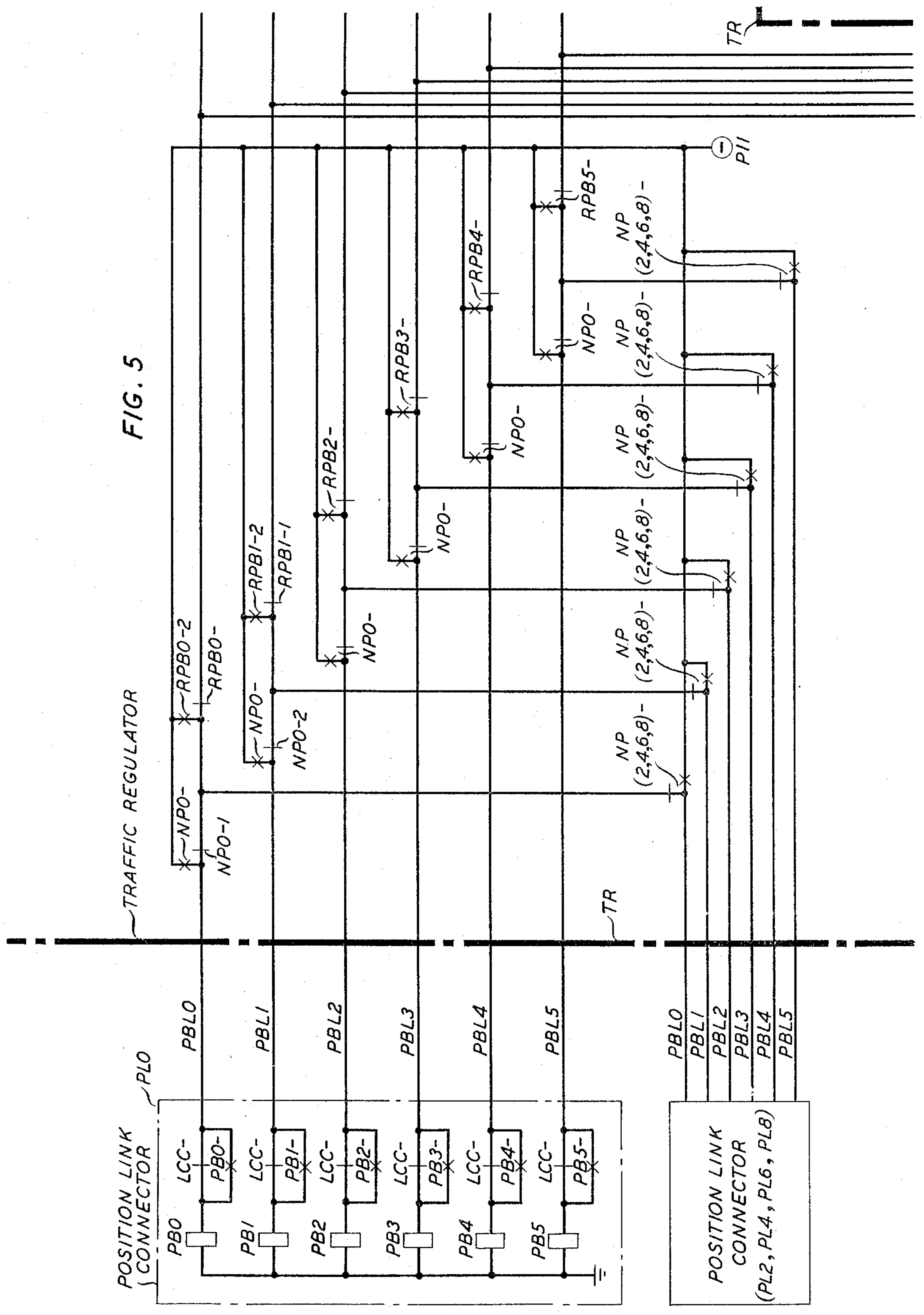
Figure 6:
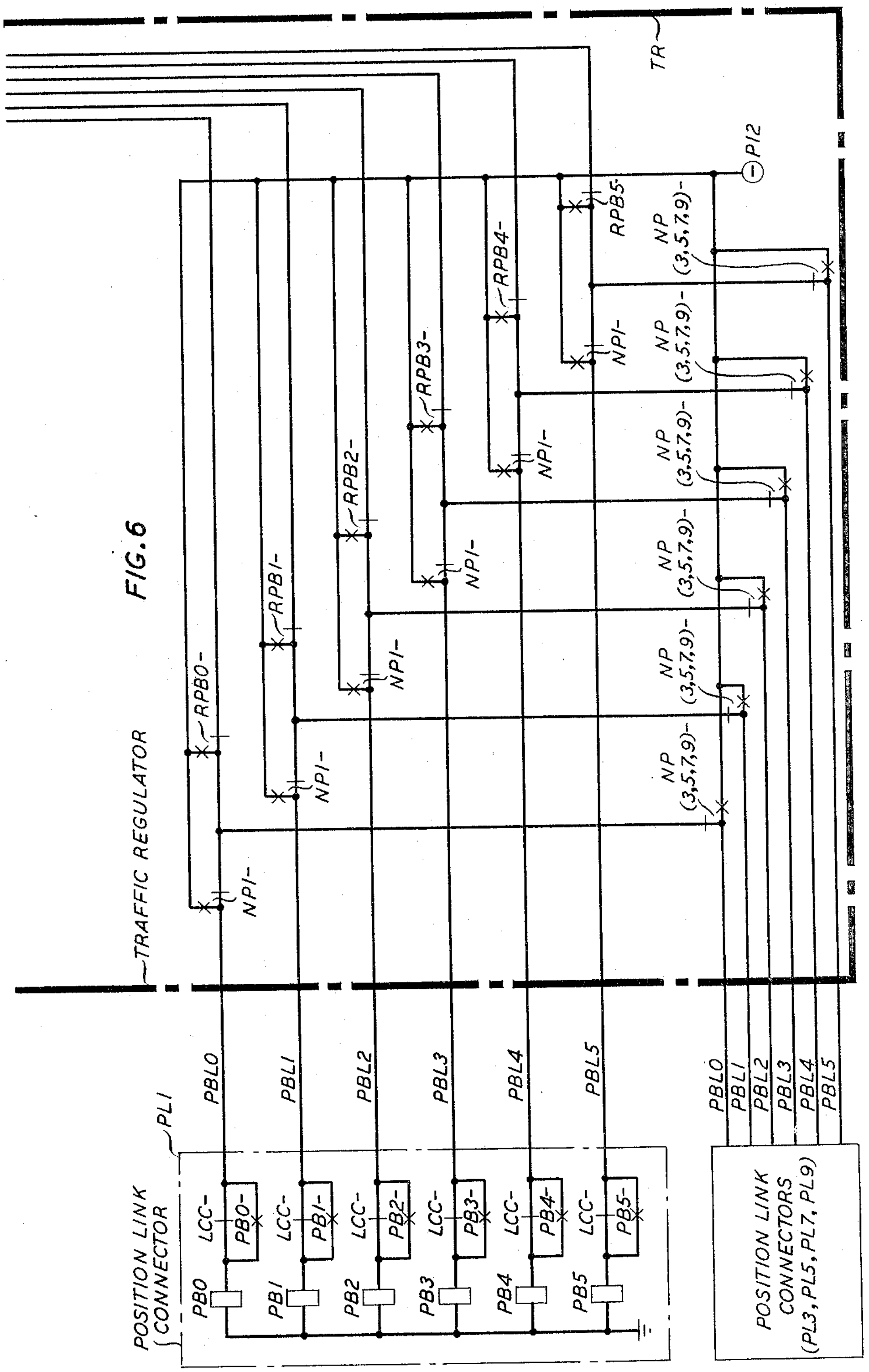

Considering now the left-sides of FIGS. 5 and 6, each of the position links PL0–PL9 includes six position busy relays PB0–PB5 for indicating the availability of the positions OP1–OP66 to serve the six different class-of-service calls. These relays also allow each position link to seize one of the link controllers LC0–LC2 of FIG. 1, as set forth in the Curtis disclosure, only if an operator is available to serve a service requesting trunk circuit associated with that link. The PB– relays of each of the links PL0–PL9 are connected to an individual one of the ten sets of the leads PBL0–PBL5, of which only four sets are shown in FIGS. 5 and 6. Each of the PB– relays is operated to indicate that none of the positions OP1–OP66 is available to serve the class-of-call with which it is associated. The operate path for each PB– relay is from ground through its winding and a break contact of an LCC relay (not shown in the present drawing but shown in FIG. 106A of the Curtis disclosure) to the negative potential connected to the associated PBL– lead under control of either an RPB– relay or an NP– relay as hereinafter explained. Upon operating, the PB– relay closes a locking path for itself to the negative potential on the PBL– lead through its make contact which bridges the LCC relay contact in its operate path. The PB– relay is released by the disconnection of the negative potential from the associated PBL– lead when one of the positions OP1–OP66 becomes available to serve the class-of-call with which it is associated.

Figure 9:
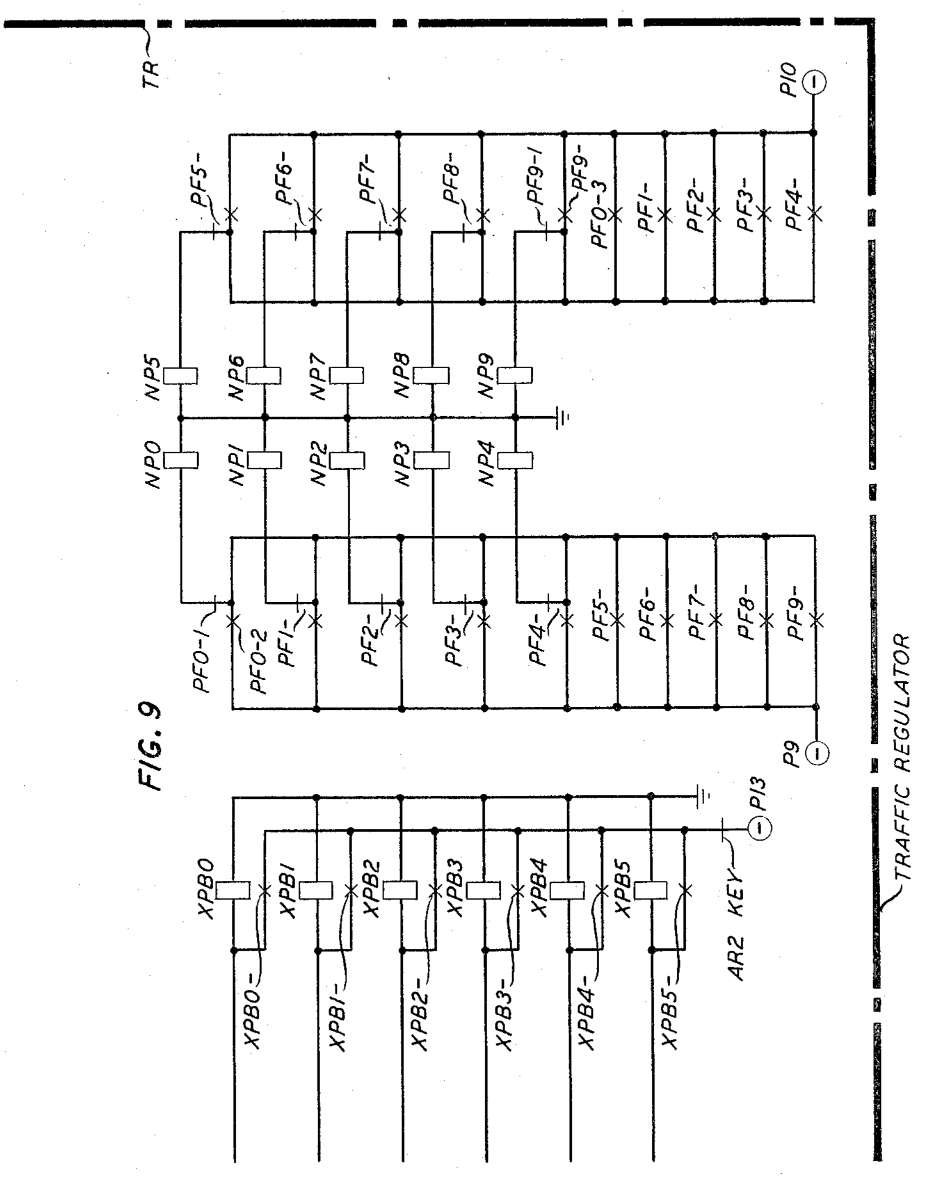

In order to understand clearly the circumstances under which the negative potentials, or "positions busy" signals, are connected to the PBL0–PBL5 leads, it is advisable first to describe the features of the NP0–NP9 relay circuit of FIG. 9 and the manner in which these relays are operated to apply "positions busy" signals over the ten sets of PLC0–PLC5 leads of FIGS. 5 and 6 to the position links PL0–PL9 when priority service requests are registered in these links. As previously stated, the NP0–PN9 relays are operated under control of the PF0–PF9 relays of FIG. 3, each of which is individually associated with one of the links PL0–PL9. When one of the PF0–PF9 relays is operated to signify that a priority request has been registered on the associated one of the links PL0–PL9, it opens the operate path for the correspondingly numbered one of the NP0–NP9 relays and, at the same time, completes the operate circuits for all of the other ones of the NP0–NP9 relays.

For example, when relay PF0 is operated, it opens its contact PF0–1 of FIG. 9 in the operate path for relay NP0 to prevent relay NP0 from operatnig. Operated relay PF0 also causes the operation of relays NP1–NP9. Relays NP1–NP4 operate over the paths from ground through the NP1–N4 relay windings in parallel, the associated break contacts of the relays PF1–PF4 and contact PF0–2 to the negative potential P9. Similarly, the relays NP5–NP9 operate over the paths from ground through the NP5–NP9 relay windings in parallel, the associated break contacts of relays PF5–PF9 and contact PF0–3 to the negative potential P10.

It may be noted that if more than one of the PF0–PF9 relays operate, the correspondingly numbered ones of the NP0–NP9 relays will be released and all of the other ones of the NP0–NP9 relays will be operated over the described paths. For example, when relays PF0 and PF9 are operated, the operate paths for the relays NP0 and NP9 are opened at contacts PF0–1 and PF9–1 while the other relays NP1–NP8 are operated over the previously traced paths.

Each of the NP0–NP9 relays is associated with an individual one of the position links PL0–PL9 and, when operated, applies "positions busy" signals to the busy leads PBL0–PBL5 extending to that link. For the purpose of illustration, let it be assumed that a priority request has been registered in link PL0 and, accordingly, has effected the operation of relays PF0 and NP1–NP9, as well as, blocking of the operation of relay NP0 as explained previously. Under these conditions, it may be seen in FIG. 5 that the negative potential P11 is connected to the links PL2, PL4, PL6 and PL8 via the associated sets of leads PBL0–PBL5 and the make contacts of the associated relays NP2, NP4, NP6 and NP8. Similarly, in FIG. 6, the negative potential P12 is connected to the links PL1, PL3, PL5, PL7 and PL9 via the associated leads PBL0–PBL5 via the make contacts of relays NP1, NP3, NP5, NP7 and NP9. Accordingly, the application of the potentials P11 and P12 to the leads PBL0–PBL5 under control of the NP0–NP9 relays and in response to a priority request from a trunk circuit, alters the actual position availability signals supplied to leads PBL0–PBL5. Hence, although operator positions may be actually available for serving the various classes-of-calls, the receipt of a priority request from one of the trunk circuits on link PL0 causes the traffic regulator to alter the position available signals (ground on leads PBL0–PBL5) to position busy signals (negative potentials P11 and P12 on leads PBL0–PBL5) whereby the priority requesting circuit on link PL0 is connected to an available operator position before any nonpriority requesting circuit.

The application of the negative potentials P11 and P12 to the PBL0–PBL5 leads causes all positions busy relays PB0–PB5 on each of the links PL1–PL9 to operate if that link is not presently connected to one of the link controllers LC0–LC2. If one of the links PL1–PL9 is connected to a controller, the LCC– contacts in the operate paths of the PB0–PB5 relays of that link are opened as described in the Curtis disclosure to prevent these relays from operating and interfering with the connection of a trunk circuit associated with that link. It is noted that only the PB0–PB5 relays on link PL0 are operated, as already explained, in accordance with the actual availability of the positions OP1–OP66 to serve the different classes-of-calls. This mode of signaling insures that priority requesting trunk circuits are connected to the positions OP1–OP66 before any non-priority requesting trunk circuit, as set forth in the Curtis disclosure.

Each of the leads PBL0–PBL5 of FIGS. 5 and 6 is connected to one of the six cross-detector relays XPB0–XPB5 of FIG. 9 through a break contact of each one of the ten non-priority relays NP0–NP9 and a break contact of one of the six position busy relays RPB0–RPB5. Each of these relays is a sensitive relay which operates if an electrical potential of sufficient magnitude is present on the associated PBL– lead and causes audible and visual alarm signals to be provided for the maintenance personel. To illustrate, let it be assumed that the negative potential P11 is present on the lead PBL1 associated with position link PL0 as a result of a cross between the leads PBL1 and PBL0 when potential P11 is applied to lead PBL0 via contacts RPB–2 and NP0–1 as later described. The presence of potential P11 on lead PBL1 immediately operates relay XPB1 over the path from ground through its winding and the contacts RPB1–1 and NP0–2 to the negative potential on lead PBL1. Upon operating, relay XPB1 locks through its contact XPB1–1 and the break contact of the alarm release key AR2 to the negative potenial P13 of FIG. 9. The operation of relay XPB1 also closes its contact XPB1–2 to activate the visual and audible alarm circuit ALM of FIG. 3. Thereafter, an attendant may identify and correct the indicated cross and activate the key AR2 to open the locking path of relay XPB1 for releasing it.

By providing the XPB0–XPB5 cross-detector relay arrangement, the traffic regulator TR is enabled to insure that position busy relays PB0–PB5 of the position links PL0–PL9 are not falsely operated. In the event that any of the PB– relays was operated by a foreign potential on the associated lead PBL– as the result of crossed leads, all calls of the class-of-service associated with that particular PB– relay would be blocked from connection to the positions OP1–OP66 as long as the crossed lead condition persisted.

*All operator positions busy.*—The 66 operator positions OP1–O66 are divided into seven groups classified as the position groups A–G in the Curtis system. This classification is to facilitate controlling the interconnection of the calling trunk circuits with operator positions and to insure that during certain traffic periods the seating of operators can be administered to avoid cases where the occupied positions are all in the same position group.

Each of the seven position groups is assigned to an individual one of the group busy relays GBA–GBG in the traffic regulator of FIG. 8. A group busy relay GB– is operated under control of the position control circuits associated with the same group when the positions constituting that group are all busy, unoccupied, or otherwise not available for serving calls. For example, when all positions of group A are busy, the GBA relay is operated over the path from ground through its lower winding, contact PR–1, lead GBL0, and the break contact of the CAMA call-waiting relay CCW (not shown in the present drawing but shown in FIG. 2 of the J. Baumfalk et al. disclosure) to the negative potential P14 in the position control circuits, such as circuit PCC1 of FIG. 1, of position group A.

Upon the operation of a GB– relay, the corresponding one of the group busy relays AGBA–AGBG of FIG. 7 is operated to inform the CAMA position link CPL that positions in the associated position group are unavailable for serving CAMA calls. For instance, upon the operation of relay GBA, the relay AGBA is operated over the path from ground through the AGBA relay winding, the cross-connection field, lead GBLA, and contact GBA–1 to the negative potential P15.

It may be seen in FIG. 7 that the cross-detector relays XGBA–XGBG as connected to the group busy leads GBLA–GBLG via the contacts GBA–2 through GBG–2 for detecting foreign potentials on these leads. Such potentials may be connected to these leads when they are crossed and a potential of sufficient magnitude is connected to one of these leads. For example, when leads GBLA and GBLG are falsely crossed and the negative potential P15 is connected to lead GBLA through contact GBA–1, relay XGBG is operated over the path from ground through its winding and contact GBG–2 to potential P15. In operating, relay XGBG locks through its contact XGBG–1 and the break contact of the alarm release key AR3 to potential P5. Operated relay XGBG also closes its contact XGBG–4 to activate the alarm circuit ALM of FIG. 4 for informing the maintenance personnel of the cross condition. After the cross condition has been corrected, an attendant may activate the key AR3 for releasing relay XGBG and thereby deactivating the alarm circuit ALM. This cross detector circuitry prevents the AGBA–AGBG relays from being falsely operated and insures that correct information is given to the CAMA link CPL concerning the availability of the positions OP1–OP66.

When one of the group busy relays GBA–GBG of FIG. 8 operated, as explained, it may shunt its other winding to ground through one of its make contacts and a make contact of one of the CW0–CW5 relays of FIG. 3 for making itself slow-releasing. This slow-releasing characteristic is used to regulate the ordered sequence in which an operator position becomes available for serving the special service and the CAMA calls during heavy traffic conditions. Each of the relays GBA–GBG is released when an operator position in the corresponding group becomes again available to serve calls and the negative potential is disconnected from the lead GBL0–GBL7.

Turning now to the feature whereby the traffic regulator TR regulates the ordered sequence in which the positions OP1–OP66 are made available for serving special service and CAMA calls, it will be initially assumed that all positions OP1–OP66 in the position groups A–G are busy and that the positions become available, or idle, one-by-one. Let it further be assumed that a position becomes available in group A for serving dial "O" calls and that a trunk circuit associated with one of the position links PL0–PL9 has already activated the CW0 relay of FIG. 3 as previously explained. Under these conditions, the position busy relays RPB0–RPB5 of regulator TR and PB0–PB5 of all links PL0–PL9 will be operated. It may be noted that the upper winding of the relay RPB0 of FIG. 3 is not shunted to ground at this time because contact CW0–9 is opened, and, accordingly, relay RPB0 is a relatively fast-releasing device. In contradistinction, the upper windings of all of the operated relays GBA–GBG will be shunted to ground, as described previously, for making these relays slow-releasing devices with respect to relay RPB0.

When the operator position in group A becomes available under the foregoing conditions, the traffic regulator TR will make that position available for connection to a dial "O" trunk circuit having a registered request in one of the links PL0–PL9 before it is available to a CAMA trunk circuit which is also requesting connections to an operator position. The regulator TR regulates the order in which the position is made so available by the controlled release times of the relays RPB0 and GBA. At the time that the position becomes idle, the associated position control circuit signals the key control position control circuit KCP of FIG. 8 to release relay PCA0. In releasing, relay PCA0 quickly releases relay RPB0 which, in turn, signals the position links PL0–PL9, as previously described, that a position is available to serve a dial "O" call. A preferred one of the links PL0–PL9 thereafter seizes one of the controllers LC0–LC2 of FIG. 1 for effecting the interconnection of the idle position with a dial "O" trunk circuit having a service request registered in that link. A short time after relay RPB0 has released and the preferred one of the links PL0–PL9 has seized the controller, the relay GBA releases and informs the CAMA position link CPL that a position is available. However, the time delay between the release actions of relays RPB0 and GBA insures that one of the controllers LC0–LC2 of FIG. 1 will seize the available position before the CAMA link controller CLC of FIG. 1.

After all of the trunk circuits, which have registered requests in the position links PL0–PL9 and activated the associated one of the CW0–CW5 relays of FIG. 3, have been connected to an operator position during the heavy traffic period, the CW0–CW5 relays are released. In addition, if the operator positions are yet all busy and there are no priority requests registered in the links PL0–PL9, the upper windings of the RPB0–RPB5 relays are then shunted to ground, as previously explained, for making them slow-releasing devices. Furthermore, the released relays CW0–CW5 open the shunt path about the secondary windings of the GBA–CBG relays for making these relays faster releasing than the RPB0–RPB5 relays are at present. Accordingly, when the next operator position becomes idle, the associaed B– relay is released before any of the RPB0–RPB5 relays. This release sequence enables the CAMA position link CPL to seize the CAMA controller CLC for effecting the interconnection of a CAMA trunk circuit with the available position before any of the position links PL0–PL9 is enabled to seize one of the controllers LC0–LC2 in response to the receipt of a service request from an associated trunk circuit.

When all of the positions OP1–OP66 are busy, the CAMA lamp CL of FIG. 8 at each of the positions may be lighted to notify the operators that CAMA calls are awaiting service. Each CL lamp is energized over the path in FIG. 8 from ground through the lamp, lead CLL, contact GBG–, GBB– through GBF– (not shown), GBA–5 and CCW–6 to potential P16. As a result, if one of the operators is busy serving a long work-time call and she ascertains that the completion of that call will be delayed, she has the option of causing a short work-time CAMA call to be connected over a CAMA loop to her position for immediate service on a so-called overlap basis. In serving the calls on an overlap basis, the delayed call circuit is temporarily disconnected from the operator's telephone facilities while these facilities are connected to a CAMA call circuit. After the CAMA call has been served, the operator telephone facilities are automatically disconnected from the CAMA call circuit and reconnected to the delayed call circuit.

The manner in which CAMA calls are served on an overlap basis is set forth in detail in the cited J. Baumfalk et al. disclosure. As set forth therein, the operator initiates the connection of a CAMA call to her position on an overlap basis by depressing a CAMA call-waiting key CAMA–CW (not shown) which results in the operation of a CCW relay (not shown) in the associated position control circuit. When the latter relay operates, it temporarily disconnects the negative potential P14 from the associated one of the GBL0–GBL6 leads for releasing the associated one of the GBA–GBG relays in the traffic regulator TR which, in turn, causes the corresponding one of the AGBA–AGBG relays on the CAMA link CPL to be released for causing a CAMA call to be connected to the requesting operator's position for service as set forth in the cited Baumfalk et al. disclosure. While the foregoing operations are in progress, the RPB0–RPB5 relays of FIG. 4 remain operated to block the connection of service requesting trunk circuits of links PL0–PL9 to the positions OP1–OP66. After the CAMA call has been served by the operator, the delayed call is automatically reconnected to the operator telephone facilities for service.

Proceeding now to another aspect of the traffic regulator TR, a description is presented of the manner in which it regulates the ordered sequence in which the operator positions are made available for serving calls on trunk circuits in the different class-of-service trunk groups on links PL0–PL9 during heavy traffic periods when the positions become idle one-by-one. Initially, let it be assumed that dial "O" and other special service trunk circuits have registered non-priority requests in links PL0–PL9 and that certain of the special service trunk circuits have registered priority requests in these links. In addition, let it be assumed that the dial "O" trunk circuits have registered their requests after the master gate relay MGT has been operated and released, as previously describd, and that relay CW0 has not been operated to activate the dial "O" gate relays on the links PL0–PL9. Let it further be assumed that relays CW1–CW5 are operated and that all positions are presently busy. Accordingly, the RPB0–RPB5 relays will be operated to signal the links, as described previously, that all positions are busy.

Under the foregoing conditions, the upper winding of relay RPB0 will be shunted to ground, as already explained, for making it slow-releasing. At the same time, however, the shunt paths around the upper windings of relays RPB1–RPB5 will be opened at the contacts CW1–9 through CW5–9 for making these relays faster releasing than relay RPB0 is at present. Thus, when one of the operator positions becomes idle and it is capable of serving dial "O" and other of the special service calls, either relay ACA or some of the relays PCA0–PCA5 are released by circuit KCP for causing the slow-release of relay RPB0 while the other of the relays RPB1–RPB5 controlled by the released relay ACA or PCA1–PCA5 are quickly released. The released ones of the RPB1–RPB5 relays immediately signal the links PL0–PL9 that an operator position is available for serving the corresponding classes-of-calls by disconnecting the negative potentials P11 and P12 from the leads PBL1–PBL5.

Thereafter, the delayed release of relay RPB0 is completed and the links PL0–PL9 are signaled, as previously described, that an operator position is available for serving dial "O" calls. This relay between the release of relay RPB0 and the other RPB– relays enables a preferred one of the links PL0–PL9 to seize one of the link controllers LC0–LC2 for effecting the interconnection of the available position with a priority requesting one of the special service trunk circuits associated with the preferred link. If there was no priority requesting trunk circuit on the preferred link, a preferred one of the non-priority requesting special service trunk circuits would be connected to the available position. The delayed release of relay RPB0 insures that the dial "O" calls are not served before earlier received special service calls.

After the available position has been allotted for connection to the special service trunk circuit, all positions again become busy and the PB0–PB5 relays on the links PL0–PL9 are again operated as hereinbefore described. When another position becomes idle the foregoing circuit actions are repeated in the regulator TR and insure that special service calls on links PL0–PL9 are served in the approximate order in which they are received at the tandem office.

It is to be understood that the hereinbefore described arrangements are illustrative of the principles of my invention. In light of this teaching, it is apparent that numerous other arrangements may be devised by those skilled in the art without departing from the spirit and scope of the invention.

What is claimed is:

1. In combination, a plurality of operator positions for serving telephone calls, groups of calling circuits, each of said calling circuits having means for selectively requesting non-priority and priority connections to said positions, a plurality of position connectors each being individually connected to a predetermined number of said groups of circuits and being responsive to the receipt of non-priority and priority requests from said circuits for connecting said requesting circuits to the available ones of said positions, means for supplying signals to said connectors to signify the actual availability of said positions to serve said calls, and means responsive to a priority request from any one of said circuits for selectively altering said signals to effect the connection of said one circuit through said connected connector to an available one of said positions on a priority basis with respect to said circuits requesting non-priority connections.

2. The combination in accordance with claim 1, wherein said supplying means comprises first means for supplying signals to each of said connectors to signify when at least one of said positions is available for serving said calls, second means for supplying busy signals to each of said connectors to signify when said positions are unavailable for serving said calls, and wherein said altering means comprises means responsive to a priority request from any one of said calling circuits for enabling said first means to supply said position available signals to said connector connected to said priority requesting circuit and said second means to supply said busy signals to all of said connectors except said one connector and thereby controlling the connection of said priority requesting circuit to an available position on a priority basis.

3. In a switching system, operator positions each being selectively preconditioned for serving some or all of a plurality of different classes-of-calls, groups of calling circuits for serving said classes-of-calls, each of said circuits having means for selectively requesting connections to said positions on non-priority and priority bases, a plurality of position connectors each being individually connected to a number of said groups of circuits for interconnecting said requesting circuits to available ones of said positions, means for furnishing signals to said connectors to signify the actual availability of said positions to serve each of said classes-of-calls, and means responsive to a priority request from any one of said circuits for supplying make busy signals to all of said connectors except said connector connected to said one circuit to signify that said positions are unavailable for serving each of said classes-of-calls and thereby enabling said one circuit to be interconnected through its connected connector with an available one of said positions before any of said circuits requesting non-priority connections.

4. In a switching system, operator positions each being selectively preconditioned for serving some or all of a plurality of different classes-of-calls, groups of calling circuits for serving said classes-of-calls, each of said circuits having means for selectively requesting connections to said positions on non-priority and priority bases, a plurality of position connectors each being individually connected to a predetermined number of said groups of cricuits and insluding: switch means operable for interconnecting said connected circuits with any available one of said positions and means responsive to requests from said connected circuits for providing a control signal when one of said positions is available for serving a call on a requesting one of said circuits, controller means responsive to a control signal from any one of said connectors for operating said switch means of said one connector for interconnecting said requesting one of said circuits with said available one of said positions, means for furnishing signals to each of said connectors to signify the actual availability of said positions to serve each of said classes-of-calls, and means responsive to a priority request from any one of said circuits for supplying make busy signals to all of said connectors except said connector connected to said priority requesting circuit to signify that said positions are unavailable for serving each of said classes-of-calls and thereby enabling said excepted connector to provide said control signal to said controller means for effecting the interconnection of said priority requesting circuit with an available one of said positions before any of said circuits requesting non-priority connections.

5. In a switching system in accordance with claim 4, the combination wherein said furnishing means comprises an individual relay device for each one of said classes-of-calls, which relay device is operative under the control of said positions for furnishing busy signals to each of said connectors when each of said positions is actually unavailable for serving said one class-of-call.

6. In a switching system in accordance with claim 5, the combination wherein said supplying means comprises relay means operable for selectively supplying said make busy signals to each of said connectors, and an individual relay circuit for each one of said connectors which relay circuit is responsive to a priority request from any one of said calling circuits associated with said one connector for operating said relay means to supply said make busy signals to all of said connectors except said one connector.

7. In a switching system in accordance with claim 6, the combination wherein said relay devices and said relay means comprise a common signaling means for sending said busy and make busy signals to said connectors.

8. In a switching system in accordance with claim 7, the combination wherein said common signaling means comprises an individual conductor for each one of said connectors, which conductor is individually associated with one of said classes-of-calls, and wherein said relay devices and said relay means further comprise a coded relay contact configuration to apply said busy and make busy signals to each of said conductors.

9. In a switching system in accordance with claim 5, the combination further comprising a call-waiting circuit for ascertaining the approximate order in which said calling circuits request non-priority connections to said positions for each of said classes-of-calls, and means activated by said waiting circuit for controlling the ordered sequence in which all of said operated relay devices release for withdrawing said busy signals from said connectors when one of said positions becomes idle after all of said positions have been unavailable for serving any of said classes-of-calls, whereby said idle position is made available for serving a longer waiting class-of-call before a relatively shorter waiting class-of-call.

10. In a switching system in accordance with claim 9, the combination wherein each of said relay devices is controllable to be selectively fast and slow releasing, and said call-waiting circuit comprises an individual relay for each of said classes-of-call for selectively controlling the fast and slow release of one of said relay circuits, whereby said idle position is made available for serving a longer waiting class-of-call before a relatively shorter waiting class-of-call.

11. In a switching system in accordance with claim 10, the combination wherein said supplying means comprises an individual relay associated with each one of said connectors, which relay is responsive to a priority request in said associated connector for effecting the fast release of all of said relay devices after said one position becomes idle, whereby said idle position is immediately made available to serve the class-of-call for which priority connections are being requested.

12. In combination, groups of trunk circuits for receiving a plurality of different classes-of-calls, an operator position for serving each of said classes-of-calls, switch means operable for connecting said circuits to said position, means responsive to the receipt of calls in said circuits for furnishing an individual control signal for each of said classes-of-calls when said position is available for serving said classes-of-call, control means responsive to the receipt of any one of said signals for operating said switch means to connect said position to one of said circuits having received a class-of-call corresponding to said one control signal, means activated by said position for sending busy signals for each of said classes-of-call to said furnishing means when said position is unavailable for serving a call for blocking the furnishing of any of said control signals to said control means, means for determining the approximate order in which each of said classes-of-call is received by said circuits, and means activated by said determining means for interrupting the sending of said busy signals for each of said classes-of-call in an ordered sequence when said position becomes available for serving a call to enable said furnishing means to supply control signals to said control means for each of the longer waiting classes-of-received call before a relatively shorter waiting class-of-received call.

13. In a telephone system, groups of incoming trunks, each of said trunk groups used for serving a plurality of different classes-of-calls, operator positions each selectively preconditioned for serving some or all of said classes-of-calls, link means common to all of said trunk groups for connecting any of said trunks to any of said positions, gating means for admitting said trunks into said link means for connection to said positions, and regulating means for controlling said link means and said gating means to regulate the order in which said trunks are connected to said positions, said regulating means comprising: gate control means responsive to the receipt of calls on any of said trunks for admitting the calling trunks into said link means and blocking from admission into said link means all of the other of said trunks subsequently receiving the same classes-of-calls as are on said admitted trunks until after said admitted trunks are connected to said positions, means for ascertaining the availability of said positions to serve each of said classes-of-calls, and signaling means activated by said ascertaining means for sending position availability signals to said link means to signify the availability of said positions to serve each of said classes-of-calls, and said link means being responsive to said signals for effecting the connection of said admitted trunks to appropriate ones of said positions available to serve the classes-of-calls on said admitted trunks.

14. In a telephone system in accordance with claim 13, the combination wherein each of said trunks comprises means for requesting priority connections to said positions, and said regulating means further comprises means responsive to a priority request from any of said blocked trunks for selectively altering said position availability signals to effect the connection of said priority requesting trunk through said link means to an available one of said positions before said admitted trunks.

15. In a telephone system in accordance with claim 14, the combination wherein said regulating means comprises means for determining when said positions are unavailable to serve each of said classes-of-calls and means activated by said determining means to supply position availability signals to said link means whereby said admitted trunks are preferred for connection to said one of said positions over non-admitted trunks after said one position becomes available to serve calls on both said preferred trunks and said non-admitted trunks.

16. In a telephone system, groups of incoming trunks, said trunk groups used for serving a plurality of different classes-of-calls, operator positions each selectively preconditioned for serving some or all of said classes-of-calls, a connector operable for connecting said trunks to any of said positions and including: means for indicating the availability of said positions to serve each of the received classes-of-calls, and means controlled by said indicating means for supplying an individual control signal for each of said received classes-of-calls when at least one of said positions is available for serving said received classes-of-calls, control means responsive to the receipt of a control signal from said supplying means for operating said connector individually to connect available ones of said positions to each of said trunks serving a received class-of-call corresponding to said received control signal, and regulating means for controlling said indicating means to regulate the order in which calls are connected to said positions, said regulating means comprising: a positions busy circuit controlled by said positions for sending busy signals for each of said classes-of-calls to said indicating means to signify when said positions are busy, a call-waiting circuit for determining the approximate order in which calls in each of said classes are received on said trunks, said busy circuit being further controlled by said call-waiting circuit for interrupting the sending of said busy signals for each of said classes-of-calls in an ordered sequence when one of said positions becomes available for serving a call after all of said positions have been unavailable for serving any of said classes-of-calls, whereby said indicating means supplies one of said control signals corresponding to one of said classes-of-call waiting longer for a connection to one of said positions than another of said classes-of-call for enabling said control means to control the connection of said available position to one of said trunks having received said longer waiting class-of-call before one of said trunks having received said other class-of-call.

17. In a telephone system according to claim 16, the combination wherein said call-waiting circuit comprises an individual call-waiting relay for each one of said classes-of-call, a relay control means responsive to the receipt of a plurality of said classes-of-calls on said trunks for controlling the operation of the corresponding ones of said relays, said relay control means being activated upon the operation of said ones of said relays for blocking the operation of the other of said relays upon the subsequent receipt of the other classes-of-call on other of said trunks; and said positions busy circuit including an individual busy relay for each of said classes-of-call which relay is operative under control of said positions for sending busy signals to said indicating means when said positions are unavailable for serving the corresponding class-of-call, each of said operated busy relays being controllable by one of said call-waiting relays for selectively interrupting the sending of said busy signals to said indicating means immediately and following a timed delay interval after one of said positions becomes available for serving the corresponding class-of-call.

18. In a switching system, groups of incoming trunks, each of said trunk groups used for serving a different class-of-call, a group of communication circuits for serving another class-of-call, operator positions each selectively preconditioned for serving some or all of said classes-of-calls, link means common to each of said groups of trunks for connecting any of said trunks to any of said positions, first gating means for admitting said trunks into said link means for connection to said positions, connector means for connecting any of said circuits to any of said positions, second gating means for admitting said circuits into said connector means for connector means for connection to said positions, and regulating means for controlling said first and second gating means to regulate the order in which said trunks and circuits are connected by said link means and connector means to said positions, said regulating means comprising: gating control means responsive to the receipt of calls on any of said trunks and said circuits for controlling said first and second gating means to admit the calling trunks into said link means and the calling circuits into said connector means, means responsive after the admission of said trunks for activating said first and second gating means to block all of the other of said trunks and circuits serving the same classes-of-calls from admission into said link means and said connector means until after said calling trunks and circuits have been connected to appropriate ones of said positions, means for controlling said first gating means to admit into said link means other of said calling trunks before said admitted trunks have been connected to the appropriate positions, means for ascertaining the availability of positions to serve each of said classes-of-calls, and signaling means activated by said ascertaining means for sending signals to said link means and said connector means to signify the availability of said positions to serve each of said classes-of-calls; and said link means and said connector means being responsive to said signals for effecting the connection of said admitted trunks and circuits to the appropriate ones of said positions available to serve the classes-of-calls on said admitted trunks and circuits.

19. In a switching system in accordance with claim 18, the combination wherein each of said trunks comprises means for requesting priortiy connections through said link means to said positions, said regulating means further comprises means responsive to a priority connection request from any one of said trunks for supplying positions busy signals to said connector means and for altering said availability signals sent to said link means to effect the connection of said priority requesting trunk through said link means to an available position before any other of said trunks and said circuits.

20. In a switching system in accordance with claim 19, the combination wherein said regulating means comprises means for determining when said positions are unavailable to serve each of said classes-of-calls and means activated by said determining means for controlling said signaling means to supply position availability signals to said link means and said connector means whereby said admitted trunks and said admitted circuits are preferred for connection to said positions over said blocked trunks and the trunks admitted to said link means within a predetermined period after one of said last-mentioned positions becomes available to serve calls on both said last-mentioned trunks and said preferred trunks and circuits.

21. In a communication switching system, a plurality of communication channels for receiving different classes-of-calls, a plurality of operator positions, means for selectively preconditioning said positions for serving a number of said classes-of-call, means common to all of said positions for monitoring the availability of the preconditioned positions to serve each of said classes-of-call, and means controlled by said monitoring means and responsive to the receipt of one of said classes-of-call on any one of said channels for connecting said one channel to any available one of said positions preconditioned to serve said received one of said classes-of-call.

References Cited by the Examiner

UNITED STATES PATENTS

| | | | |
|---|---|---|---|
| 2,519,287 | 8/1950 | Robb et al. | 179—51 |
| 2,881,261 | 4/1959 | Molnar | 178—27.1 |
| 2,922,847 | 1/1960 | Dunning | 179—27.1 |
| 3,133,153 | 5/1964 | Bonanno | 179—27.23 X |

FOREIGN PATENTS

| | | |
|---|---|---|
| 1,130,005 | 3/1962 | Germany. |

KATHLEEN H. CLAFFY, *Primary Examiner.*

L. A. WRIGHT, *Assistant Examiner.*